United States Patent [19]

Hunter

[11] 3,882,470

[45] May 6, 1975

[54] MULTIPLE REGISTER VARIABLY ADDRESSABLE SEMICONDUCTOR MASS MEMORY

[75] Inventor: John C. Hunter, Phoenix, Ariz.

[73] Assignee: Honeywell Information Systems Inc., Phoenix, Ariz.

[22] Filed: Feb. 4, 1974

[21] Appl. No.: 439,459

[52] U.S. Cl...... 340/173 R; 340/173 BB; 340/172.5

[51] Int. Cl........... G11c 11/40

[58] Field of Search.. 340/173 R, 173 DR, 173 AM, 340/173 BB, 172.5

[56] References Cited

UNITED STATES PATENTS

| | | | |
|---|---|---|---|
| 3,588,830 | 6/1971 | Duda | 340/173 BB |
| 3,714,637 | 1/1973 | Beausoleic | 340/173 BB |
| 3,765,001 | 10/1973 | Beausoleic | 340/173 BB |
| 3,781,826 | 12/1973 | Beausoleic | 340/173 R |

*Primary Examiner*—Terrell W. Fears
*Attorney, Agent, or Firm*—Walter W. Nielsen; Edward W. Hughes

[57] ABSTRACT

A block-addressable mass memory subsystem comprising wafer-size modules of LSI semiconductor basic circuits is disclosed. The basic circuits are interconnected on the wafer by non-unique wiring bus portions formed in a universal pattern as part of each basic circuit. A first disconnect circuit isolates defective basic circuits from the bus. A plurality of shift registers which share common control logic and driver circuits is provided for each basic circuit. A variably addressable address storage register is associated with each shift register. An inhibit chain interconnects at one level all of the basic circuits and at a lower level all of the address registers of each basic circuit, whereby one and only one address storage register of one basic circuit is responsive to store a unique address at any given time. A second disconnect circuit isolates individual defective shift registers from the bus.

20 Claims, 13 Drawing Figures

MULTIPLE REGISTER VARIABLY ADDRESSABLE SEMICONDUCTOR MASS MEMORY

CROSS-REFERENCE TO RELATED APPLICATIONS

This invention is related to U.S. Pat. application Ser. No. 439,677, filed on even date herewith, entitled "Variably Addressable Semiconductor Mass Memory" by John C. Hunter, assigned to the same assignee as the present invention.

BACKGROUND OF THE INVENTION

The invention relates generally to a memory subsystem for a data processing system, and more particularly, to a block-addressable random access store in which all of the active memory elements are comprised of conductor-insulator-semiconductor (CIS) devices formed as integrated circuits on a common substrate which may be, for example, silicon.

For a complete description of the general background of the invention, including a description of the known prior art and a description of the utility of the invention within the context of a memory subsystem, reference is made to the above-cited U.S. Pat. application. The referenced application also contains a detailed description of particular circuitry and other subject matter common to both inventions. More particularly, attention is directed to FIGS. 1–5, 12, 16, 17, 20, and 23–25, and to the entire specification, which are incorporated herein by reference and made a part hereof as is fully set forth herein, to the extent that such are not inconsistent with the present Figures and specification.

As discussed in the referenced U.S. Pat. application, the known prior art large-scale integrated-circuit (LSI) memory systems are expensive to manufacture. A primary reason for the high cost of fabricating LSI memories lies in the rather low yield characteristics of monolithic LSI devices, whereby if one lead or one circuit element of the complex configuration is defective, the entire circuit must be discarded. U.S. Pat. application Ser. No. 307,317, now U.S. Pat. No. 3,803,562, filed Jan. 12, 1972, entitled "Semiconductor Mass Memory" by John C. Hunter, and assigned to the assignee of the present invention, overcomes certain of the prior art problems involved in LSI memory fabrication. According to one embodiment of U.S. Pat. application Ser. No. 307,317, a plurality of LSI memory arrays are interconnected on a single wafer by a common bus. After fabrication, each array is successively tested with a multiprobe step-and-repeater tester, and a unique address is assigned to and semipermanently stored in each operative array. Inoperative arrays are electrically disconnected from the bus by a disconnect device formed as a part of each array. While this approach has certain advantages over the known prior art techniques for LSI memory fabrication, the assignment of a semipermanent unique address to each array has the disadvantage of requiring page tables in the memory system to translate virtual addresses into absolute addresses. It also lengthens the fabrication time. In addition, this approach has a tendency to waste the capacity of high yield wafers or to reject low yield wafers, because of the fabrication constraint that each active substrate or "assembly" consist of at least $2^N$ addressable arrays, where N is the address bandwidth. This constraint is inherent in the fabrication process, whereby a sufficient number of "groups" are joined together into an assembly of $2^N$ good arrays. The optimum assembly size is dictated in part by the limitations of the testing and addressing apparatus. Any excess number of good arrays at the assembly level is therefore wasted. Furthermore, there are spatial restraints on the usage of low yield wafers. Accordingly, it is desirable to be able to easily assign and reassign addresses within the memory subsystem. At the same time it is desirable to have the capability of disconnecting the smallest portion of any LSI circuit determined to be defective, without wasting good circuits or portions thereof. By retaining the maximum possible portion of good circuits, the per-bit cost of a memory subsystem utilizing such circuits can be substantially lessened.

The present invention, according to one embodiment, provides a plurality of basic integrated circuits on a common substrate. The basic circuits are interconnected by non-unique bus portions formed in a universal pattern as part of each basic circuit. Each basic circuit comprises a plurality of memory storage devices also connected to the bus portion. Each such storage device has associated with it an address register. The storage devices of one basic circuit share common clock, control, and driver circuitry. An inhibit chain links all of the basic circuits comprising one assembly and is further carried into the basic circuits themselves to link each individual shift register and its associated circuitry. The function of the inhibit circuitry is to enable one and only one address register within an assembly to store a unique address received during on-line data processing operations.

After fabrication each memory storage device is individually tested. Defective storage devices, as well as defective entire basic circuits, may be selectively disconnected from the interconnecting bus portion. Thus low-yield basic circuits may be utilized as well as high-yield basic circuits. Basic circuits containing major defects in the common clock, control, or driver circuitry normally are entirely disconnected from the interconnecting bus. The remaining non-defective basic circuits on the LSI circuit are utilized.

The ability to selectively disconnect defective storage devices or entire basic circuits combined with the ability to assign and reassign a unique address to one and only one address register associated with a storage device provides substantial flexibility regarding the utilization of the maximum number of non-defective storage devices and the addressing capability of the memory subsystem. The per-bit cost and access time are thereby significantly reduced over the prior art memory subsystems.

The present invention finds utility in multiprocessing, virtual memory systems such as the MULTICS system. Complex and time-consuming memory management routines, such as memory compacting routines, page tables, and core maps are eliminated, thus substantially decreasing the average access time and reducing the working store size.

Regarding memory compacting, it is understood that during the process of allocation and deactivation of memory segments, "holes" in the address space can appear. More often than not these holes are not completely filled by new allocations, and unusable fragments of space are left scattered around the memory. Left unchecked, a sizeable fraction of the total memory ace will accrue. Memory compacting routines are ımmonly used to periodically move all resident data ward the low end of the address space, filling unused ıgments and opening up a large pool of available ace at the high end of the address space. To compact e memory space, data is read out of its old address lo- ıtion and rewritten into its new location at the low end ' the address space. Data transfer of this nature is ne-wasting. For example, reading and rewriting the ıntents of a 512-bit shift register requires 1,024 mem- 'y cycles.

The present invention accomplishes memory com- ıction simply by reassigning addresses within the emory. An entire memory segment can be assigned a :w location by changing the address stored in the ad- 'ess registers of the subarrays making up the memory :gment. This is accomplished in one memory cycle, :presenting a gain of 1024:1.

In memory systems employing fixed or absolute ad- ressing, page tables are required to relate the address ısigned to a page of the memory segment (virtual ad- :ess) to the physical address in the memory system here the page is actually stored (absolute address). or each data transfer, the page table must be con- ılted, adding one or more extra memory cycles. Page ıbles are eliminated in the present invention, since ad- resses can be freely assigned throughout the memory. he address assigned to any given portion of memory simply the page number rather than some arbitrary hysical address.

Core maps, which list free and used memory space, re also done away with in the present invention, fur- ıer decreasing memory transfer time. Through the use f an inhibit chain, first linking individual operative ıemory storage devices within an array, then arrays 'ithin a group, then groups within an assembly, and fi- ally a plurality of assemblies, together into a pool of nused arrays, a free space list is automatically created ırough the use of hardware, so that any new address ɔ be assigned is in fact assigned to the top of the free pace list. Used subarrays are automatically dropped 'om the free space list until such time as they are set 'ee, whereupon they rejoin the free space list by virtue f their being reabsorbed into the inhibit chain.

The present invention provides a relatively inexpen- ive, variable record size, block-transfer auxiliary store ɔr storing mass quantities of data, and connected for ommunication with the working store of the data pro- essing system to supply programs and information to ıe working store as required for processing, and to rovide temporary storage for processed data accepted rom the working store, prior to transfer of the pro- essed data to an output device, and yet to provide uch interchange of data blocks with virtually zero la- ɜncy.

OBJECTS OF THE INVENTION

Accordingly, it is desirable to provide a large scale ıtegrated circuit comprising a plurality of variable- ield identical basic circuits, each basic circuit com- ırising a plurality of memory storage elements, wherein he basic circuits are interconnected by a non-unique ıiring arrangement permitting selective disconnection ıf defective circuits, or of memory storage elements, ınd wherein the memory storage elements each may be 'ariably addressed by the memory subsystem.

Therefore, it is the principal object of this invention to provide an improved semiconductor memory subsystem for a data processing system.

Another object of the invention is to provide an improved virtually zero latency auxiliary store for a data processing system.

Another object of the invention is to provide in a data processing system an improved auxiliary store which serves to reduce the size and accordingly the cost of the working store.

Another object of the invention is to provide an improved auxiliary store comprised of semiconductor LSI circuits.

Another object of the invention is to provide a solid state storage subsystem for replacing storage devices having mechanically driven magnetic media.

Another object of the invention is to provide an improved storage subsystem for a data processing system wherein the active elements are comprised of integrated circuits fabricated on a substrate of semiconductor material, with packaging introduced at the wafer level.

Another object of the invention is to provide a low cost, virtually zero latency, variable record size, block transfer, auxiliary store connected for communication with the working store for a data processing system, which auxiliary store affords more effective utilization of working store space.

Yet another object of the invention is to provide an improved memory subsystem for a data processing system wherein the active memory elements may each be assigned and reassigned unique addresses according to the state of the memory elements.

A further object of the invention is to provide an improved memory subsystem comprised of selectively disconnectable semiconductor LSI circuits, wherein the active memory elements are interconnected by an inhibit mechanism permitting one and only one memory element to store a unique address.

Another object of the invention is to provide an improved memory subsystem comprised of selectively disconnectable semiconductor LSI circuits, wherein one and only one of the active memory elements responds to memory function commands associated with a unique address signal.

A further object of the invention is to provide an improved memory subsystem comprised of a number of variable yield, selectively disconnectable semiconductor LSI circuits, wherein individual ones of the active memory elements may be selectively disabled if they are determined to be defective.

These and other objects are achieved according to one aspect of the invention by providing a memory subsystem in which a plurality of LSI memory arrays interconnected by a common intrinsic bus are fabricated on an uncut wafer of semiconductor material. Each array contains a plurality of subarrays each having a variably addressable address register for storing a unique address assigned to the subarray by the data processing system in the course of processing operations. An inhibit circuit links all subarrays on all wafers so that from the pool of unassigned subarrays, one and only one subarray is responsive to store a unique assigned address. Each subarray is successively tested during the fabrication process with a multiprobe step-and-repeater tester, and inoperative subarrays are electrically disconnected from the bus by a disconnect device formed as a part of each subarray. An entire array may also be disconnected from the bus if it contains a gross defect affecting all of its subarrays.

BRIEF DESCRIPTION OF THE DRAWING

The invention will be described with reference to the accompanying drawing, wherein.

DESCRIPTION OF THE PREFERRED EMBODIMENT

Data Store Subsystem — General

Figure 1:
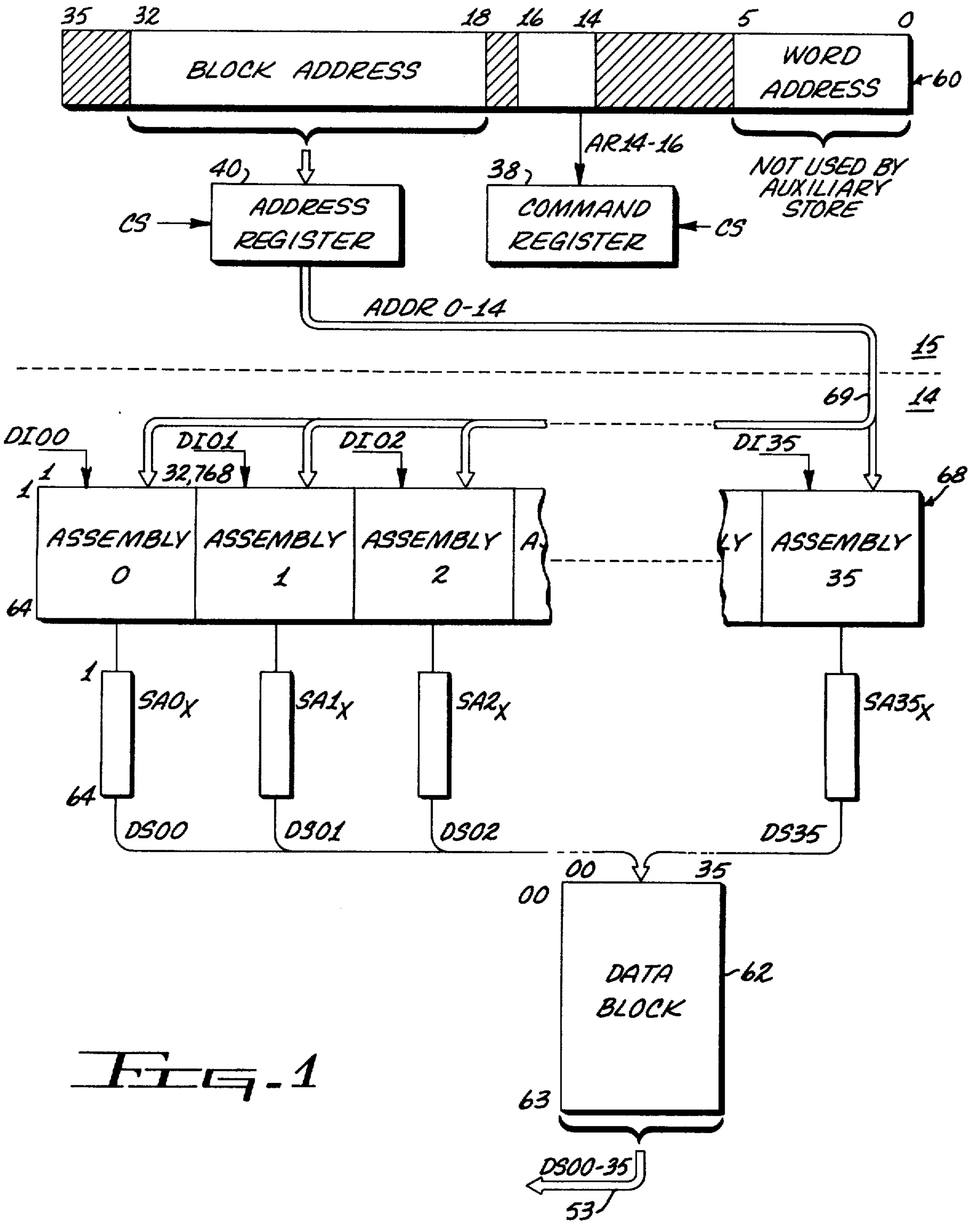
FIG. 1 is a block diagram illustrating the organization of one embodiment of a data processing system store.

A typical physical organization for the auxiliary store of my invention and an exemplary addressing arrangement are shown in FIG. 1. A data item 60 is diagrammatically illustrated comprising command and address information. The data item length was arbitrarily chosen as 36 binary digits for describing a typical arrangement. The choice of either a 36-bit word, or any other of the numbers delimiting store size, is not intended to limit in any way the scope of the invention. In the illustrative embodiment, bits 0–5 of data item 60 are representative of the absolute address of a word within each one of a plurality of data blocks. A data block 62 is diagrammatically illustrated in FIG. 1 comprising 2,304 bits of data arranged as 64 36 bit words. The data block is the smallest addressable entity of store in the auxiliary store 14 being described with reference to FIG. 1. Address bits 0–5 of data item 60, being word identifiers, are therefore not transferred to the auxiliary store 14, but are held in the address register and counter of the memory subsystem controller. (Refer to FIG. 2 of the cross-referenced application.) Address bits 0–5 are incremented binarily each time a word of a data block is transferred from the auxiliary store 14 to the subsystem controller, and are used for supplying a word address to the working store.

Still referring to FIG. 1, bits 18–32 of data item 60, representative of a block address, are transferred as the ADDRO-14 signals to the address register 40. In response to an enable CONTROL SIGNAL (CS), the address register 40 tansfers address signals ADDRO-14 to a segment of auxiliary store 14. A single segment 68 is diagrammatically represented in FIG. 1 comprising 36 assemblies labelled ASSEMBLY 0,1,2 . . . 35. ASSEMBLY 0 is typical and represents a physical entity or store having a storage capacity of 64 × 32, 768 or 2,097,152 bits of data. An assembly contains 4,096 arrays of store, each array containing eight 64-bit shift registers and capable of storing 512 bits of data. One representative shift register or subarray from each of the ASSEMBLIES 0,1, . . . 35 is diagrammatically represented in FIG. 1 and labelled, respectively, $SA0_x$, $SA1_x$, . . . $SA35_x$. The ADDRO-14 address signals are transferred to each of the ASSEMBLIES 0,1, . . . 35 of the segment 68 via an address bus 69. During a write operation, DATA IN signals DI00-35 are transferred from the input data register of the subsystem controller, each to the corresponding ASSEMBLY 0,1, . . . 35 of the segment 68, as shown in FIG. 1. Thus, for any given address *x*, data is written into 36 storage arrays $SA0_x$, $SA1_x$, . . . $SA35_x$, one from each of the ASSEMBLIES 0,1, . . . 35 of the segment 68. Similarly, during a read operation from address *x*, the contents (64 bits each) of subarrays $SA0_x$, $SA1_x$, $SA2_x$ . . . $SA35_x$ are transferred, each subarray serially by bit, as signals DS00,01,02 . . . 35 to the subsystem controller 15 via the DATA OUT bus 53. Thus, an addressed data block is transferred serially by word from the auxiliary store 14 to the subsystem controller 15.

The binary representation of bits 14–16 of the data item 60 determines the type of operation performed for the corresponding address: READ, WRITE, STORE ADDRESS, SET FREE, INITIALIZE, and REFRESH (two of the possible eight binary combinations are unused). The bits 14–16 command information (AR14-16) is held in the command register 38 during execution of the operation.

Figure 2:
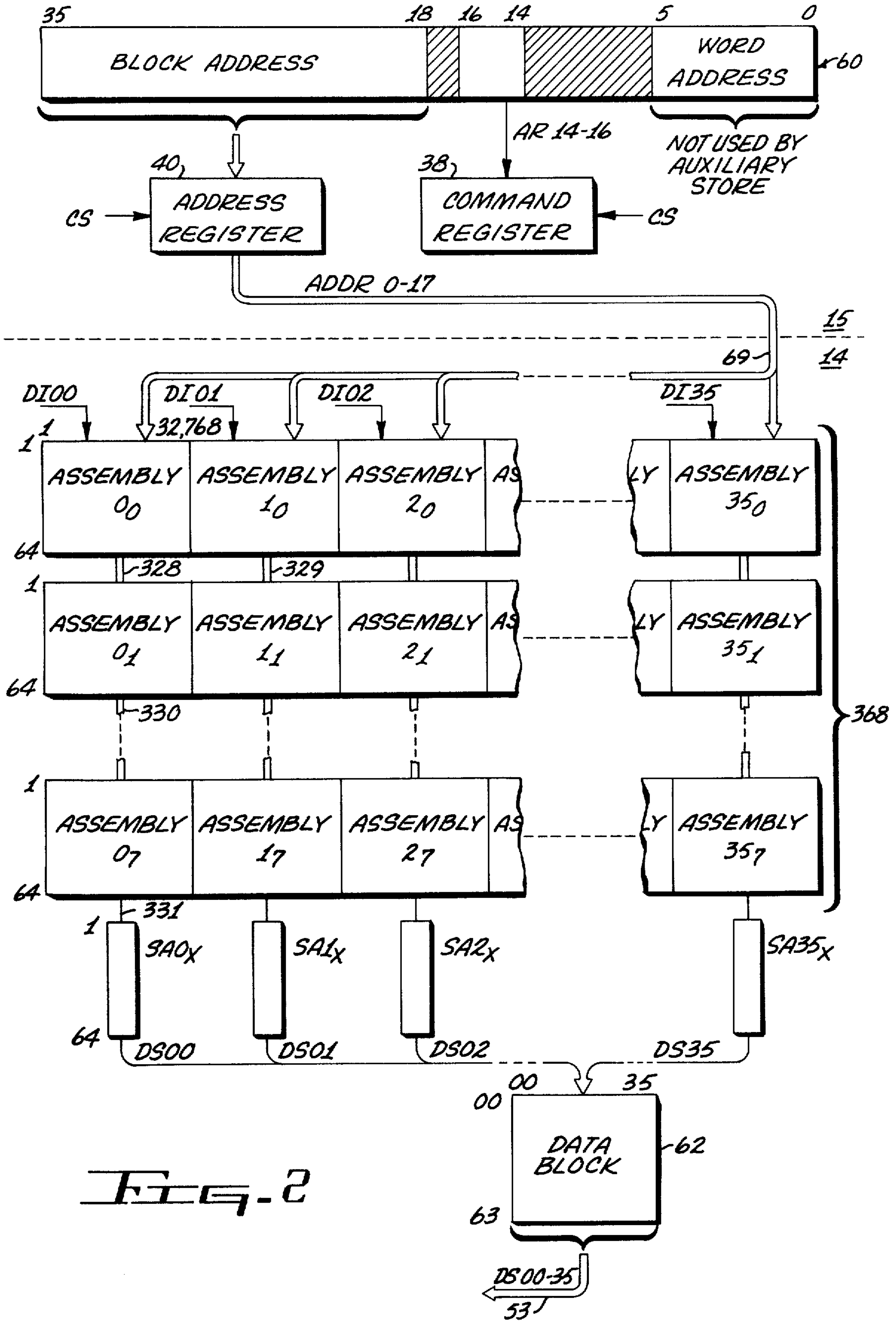
FIG. 2 is a block diagram illustrating the organization of an alternative embodiment of a data processing system store.

FIG. 2 illustrates an alternative enlarged arrangement of the auxiliary store 14 in which the memory segment 68 shown in FIG. 1, comprising 36 assemblies, has been expanded eight-fold into a memory segment 368 comprising 36 groups of 8 assemblies each. One group of 8 assemblies, for example, comprises assemblies $0_0$–$0_7$; a second group comprises assemblies $1_0$–$1_7$; and so on. Each group of 8 assemblies is interconnected by a common bus carrying data, address, and control signals. Bus segments 328 and 330, for example, form portions of a common bus linking assemblies $0_0$–$0_7$. The common busses linking the 8 associated assemblies of any one group of assemblies also carry inhibit propagation circuitry, of the type described in the cross-referenced application. The inhibit circuitry serves to link all unaddressed, good subarrays within a particular group of 8 assemblies together into a "free space" pool, and ensures that one and only one subarray in each group of 8 assemblies responds to a particular unique address transmitted to the segment 368 over address bus 69. The total number of addressable subarrays per group of 8 assemblies is 8 × 32,768 = 262,144 (or $2^{18}$). In order to address any of the $2^{18}$ subarrays within the expanded segment 368 of FIG. 2, the address bandwidth has been expanded to 18 bits comprising bits 18–35 of data word 60. It will be understood that any integer power of 2 number of assemblies may be so grouped to form a segment of store and that the grouping of 8 assemblies is merely illustrative of the manner in which the auxiliary store of the present invention may be expanded.

The actual number of good subarrays per group or er module is not a material factor. Groups having a ıbstantial number of defective subarrays (i.e., low ıeld groups) may be used to equal advantage as groups ɔntaining a high percentage of good subarrays (high ield groups). Assuming there are fifteen address lines ı the input-output bus assigned for addressing subar- ıys within an assembly, an assembly may comprise $2^{15}$ r 32,768 separately addressable subarrays. The illus- ·ative embodiment is therefore modularly expandable ı units of 32,768 good subarrays. In practice a larger umber of good subarrays may be incorporated into ach assembly to provide replacements for subarrays 'hich may become defective through shipping, han- ling, or field usage.

ıssembly Organization

In the preferred embodiment an assembly is defined s a complete, binary addressable unit of store where he number of addressable subarrays is an integer ·ower of 2. Each subarray in the assembly may be as- igned a unique binary address in a manner which will ›ecome apparent in the ensuing discussion of the cir- uits of the preferred embodiment of my invention. 'hysically, the assembly comprises a collection of mod- ıles together with the associated bipolar clock and sig- ıal drivers and sense amplifiers mounted on a printed :ircuit board.

ʌatched-Set Organization

Modules in this organization are arranged in sets such hat the total number of good subarrays is at least equal o the desired assembly address capacity. Each module s utilized, low yield as well as high yield. The individual ıubarrays have no unique address identity before on- ine addressing takes place. Initially all good subarrays vithin an assembly form a free space list. Any number ɔf subarrays, up to the addressing capacity of the as- ɜembly, may each be assigned a unique address during processing operations, by means of inhibit circuitry to be described in detail below. Address uniqueness is ob- tained by ordering the free subarrays in a chain such that each free subarray is capable of inhibiting all free subarrays below it in the chain. The inhibit chain is used only to link together all free subarrays in a pool, and it does not participate further in the addressing.

Data associated with a unique address can thus be written into the "top" of the free space list. Once the subarray at the top of the free space list has been as- signed an address, it is removed from the list and the free subarray immediately "below" it becomes the top of the list. Any non-free subarray may be reset into the free state by a special command associated with the unique address of that particular subarray. The subar- ray so reset thereby rejoins the free space list.

Data is read out of a non-free subarray by addressing the subarray and simultaneously commanding it to read the contents of its associated memory.

Figure 11:
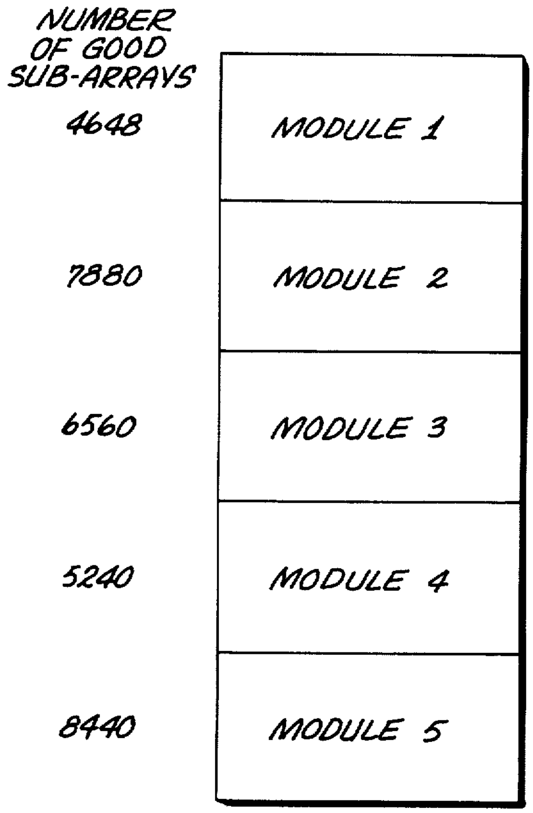
FIG. 11 is a diagram of an assembly organized with a matched set of modules.

Referring to FIG. 11, an assembly of 32,768 opera- tive subarrays comprises module 1 containing 4,648 operative subarrays, module 2 with 7,880, module 3 with 6,560, module 4 with 5,240, and module 5 with 8,440. This representative assembly illustrates the flexi- bility with which modules of varying yield may be grouped together. This organization offers the highest utilization of subarrays produced, regardless of actual yield. The cost per unit of store is determined at the as- sembly level rather than at the module level, therefore, short term yield variations brought about by the de- crease in the average number of good subarrays per module are offset because even low yield modules may be used to form an assembly. As yield increases, the cost per unit of store at the assembly level decreases dramatically without array redesign, since fewer mod- ules are used in an assembly.

Array-General Description

Figure 3:
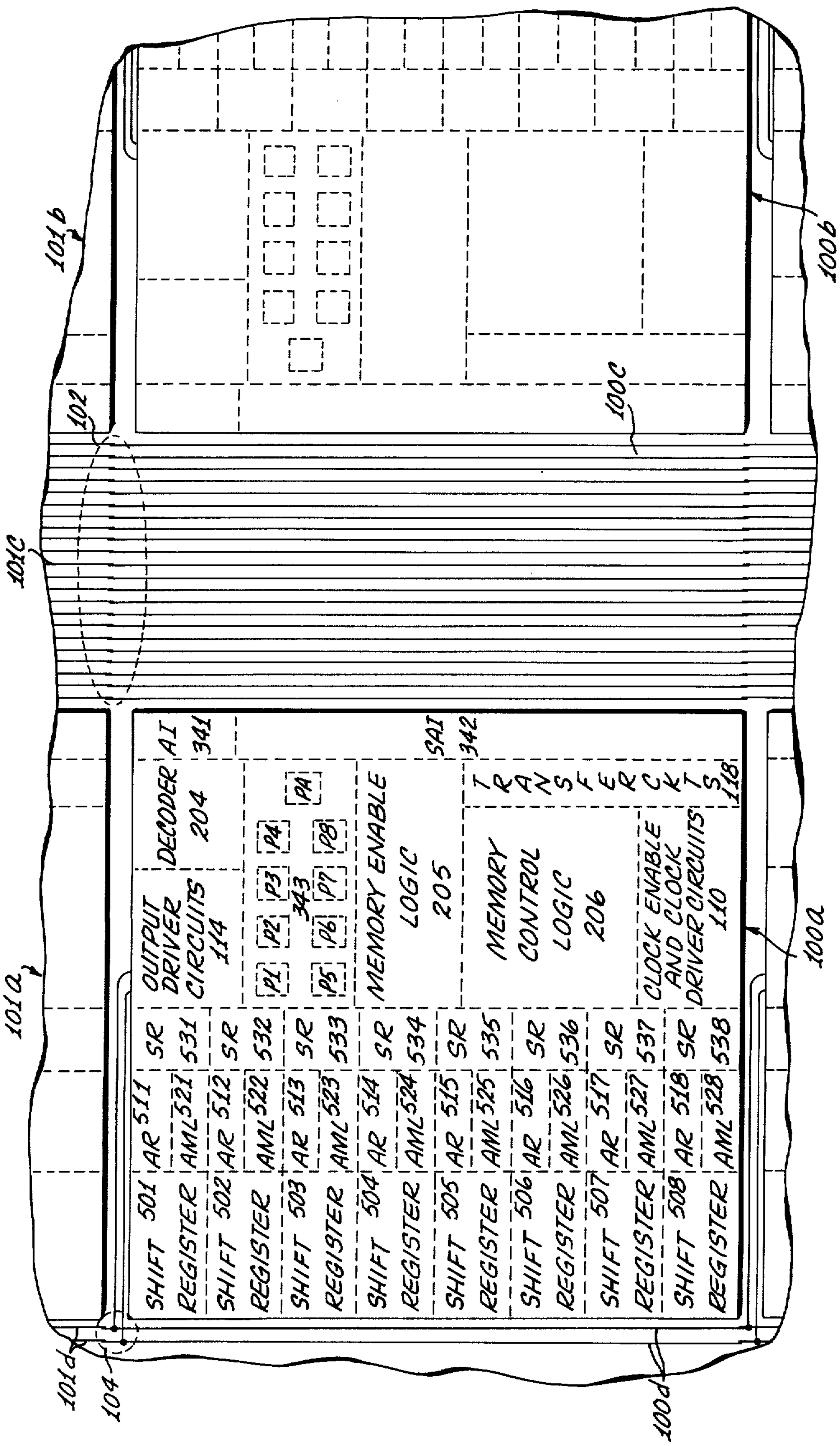
FIG. 3 is a greatly enlarged diagrammatic plan view of a fragment of a wafer showing the layout of a single array.

Referring now to FIG. 3, a diagrammatic plan view of an array pair 100 is shown comprising a left-hand array 100*a* and a right-hand array 100*b*. The latter, shown only in part, is a mirror image of the left-hand array 100*a*. A central input bus portion 100*c* compris- ing a plurality of input lines services both arrays 100*a,b*. An output data bus portion 100*d* on the left side of the left-hand array 100*a* is considered an integral part of the array 100*a*. A portion of another array pair 101 is shown adjacent to the array pair 100. The central bus portions 100*c*,101*c* and the output data bus portions 100*d*,101*d* are aligned and about one another, respec- tively, in areas 102,104 shown circled by dashed lines. The output bus portion 100d may also service an array (not shown) adjacent and to the left of array 100*a*. Thus, an input-output bus portion comprising the cen- tral input bus portion 100*c* and an output bus portion 100*d* services two arrays. Collectively, the bus portions form an input-output bus or signal distribution system common to all arrays in the group.

The various circuits comprising the array 100*a* are delineated by dashed lines in FIG. 3. The relative area occupied on the array 100*a* is not necessarily depicted, and the optimum layout of the circuits will be apparent to one skilled in the art. The circuits comprise array in- hibit circuitry 341, subarray inhibit circuitry 342, trans- fer circuits 118, disconnect control 343 comprising probe pads PA and P1-P8, decoder 204, memory en- able logic 205, memory control logic 206, clock enable and clock driver circuits 110, shift registers 501–508, address registers 511–518, address match logic circuits 521–528, state registers 531–538, and output driver circuits 114.

The array inhibit circuitry 341 and subarray inhibit circuitry 342 are located within central bus portion 100*c* according to the preferred embodiment of the in- vention, but it is within the scope of this invention to locate them within the array proper.

Input signals from the central bus portion 100*c* are transferred from the bus 100*c* to the adjacent circuit areas 110, 118, 204, 206, 511–518, and 521–528 via a plurality of leads (not shown) underlying and perpen- dicular to the leads of bus 100*c*.

Output data is transferred from the driver circuits 114 to the output data bus 100*d*.

One embodiment of my invention was fabricated using the silicon-gate process. As an aid to understand- ing the manner in which an interconnected group is formed from a plurality of identical basic circuits, ref- erence may be made to the above-referenced U.S. Pat. application Ser. No. 307,317, in which the sequence of operations in the fabrication of silicon gate semicon- ductor integrated circuits of the type disclosed by the present invention is discussed in detail.

Array — Detailed Block Diagram Description

Figure 4A:
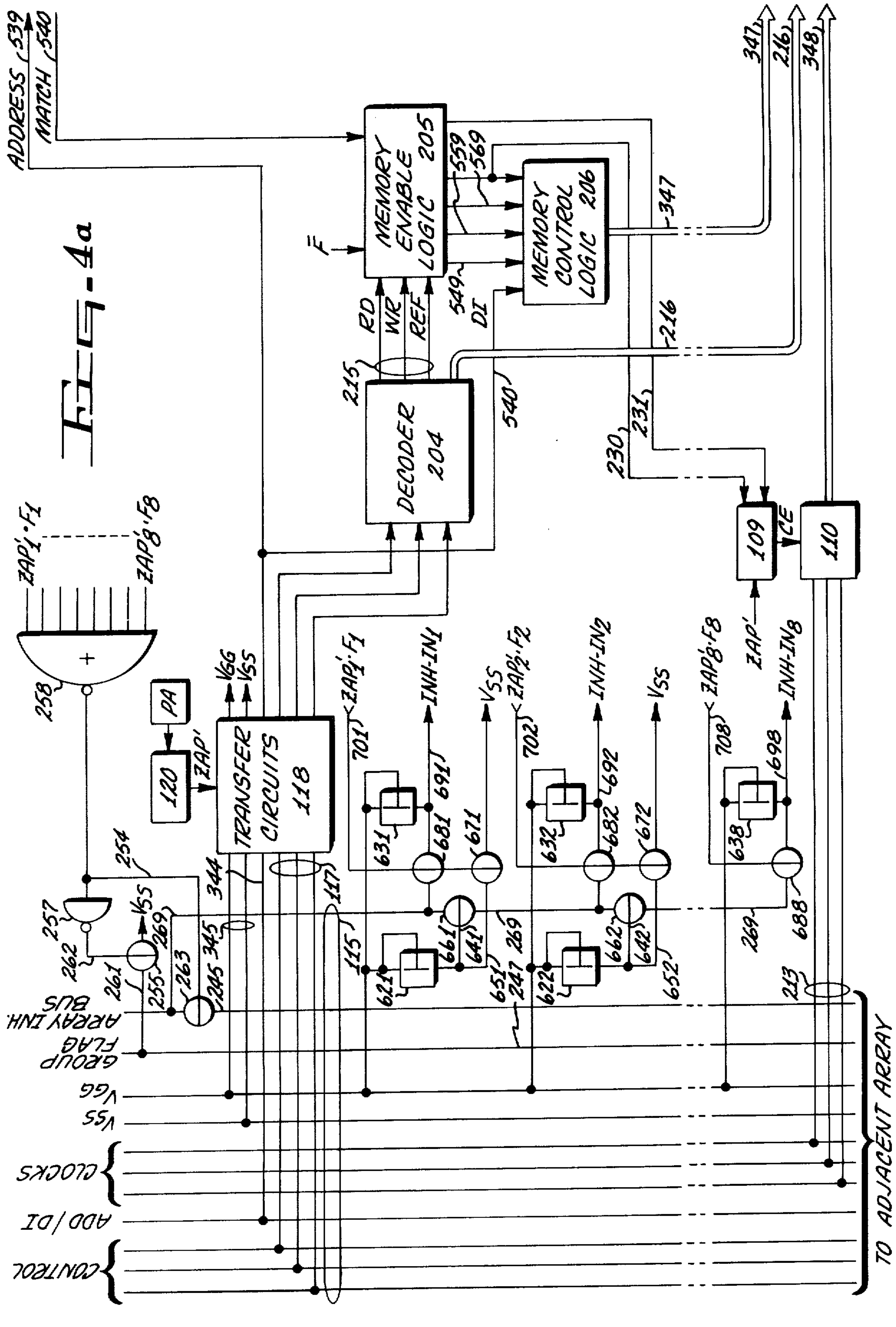
FIG. 4, composed of FIGS. 4*a* and 4*b*, is a detailed schematic block diagram of an array.
Figure 4B:
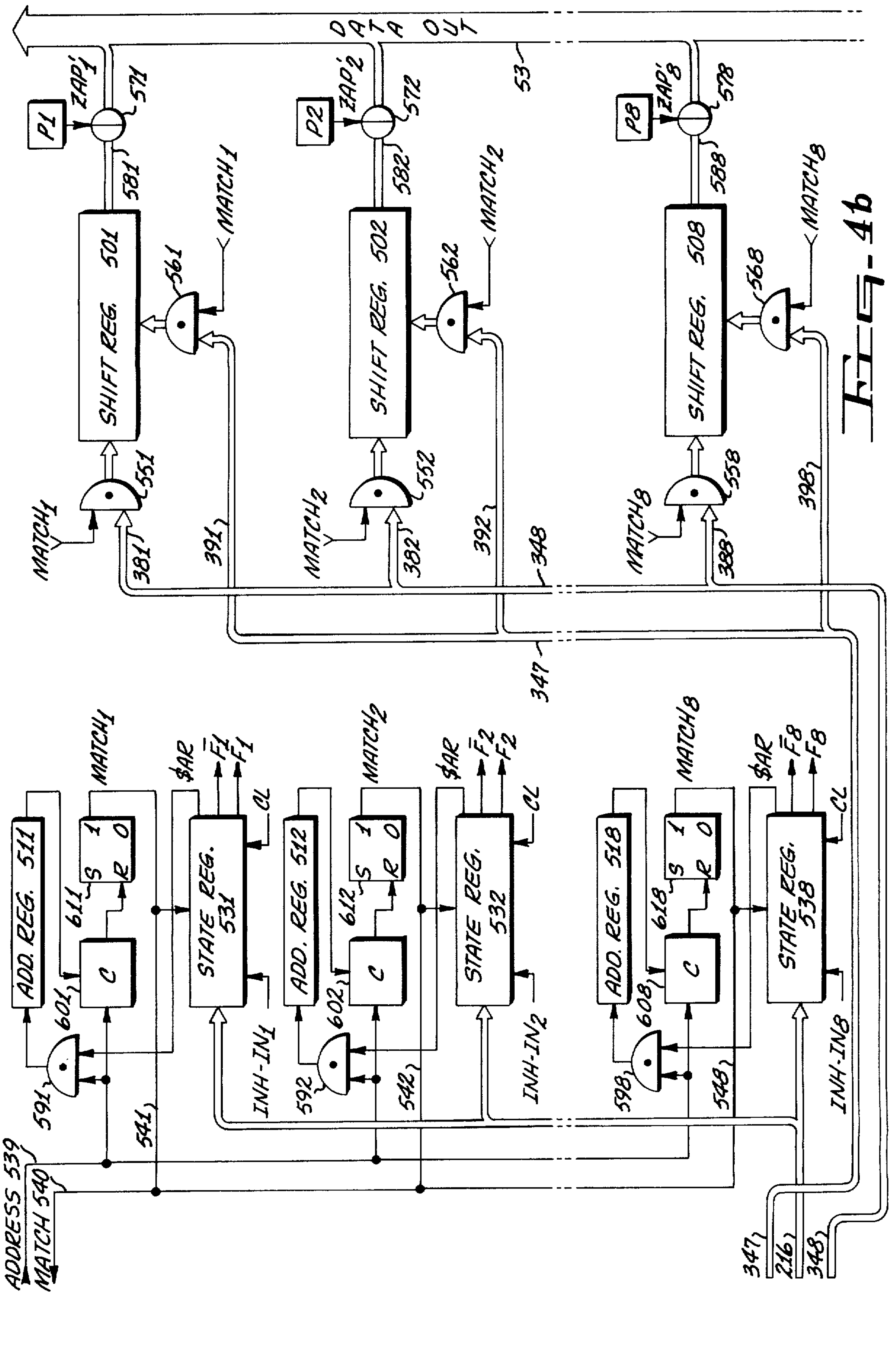

The invention utilizes a large uncut wafer of semicon- ductor material having many interconnected identical basic circuits completely formed thereon prior to testing. A detailed schematic block diagram of one basic circuit or array is shown in FIG. 4. Each array comprises 8 subarrays according to a preferred embodiment, although it should be understood that a greater or lesser number of subarrays may be included within one array. Common to each array is an input bus portion 115 and an output bus portion 53 having a plurality of interconnection lines which connect to the lines of an adjacent array by overlapping during the step-and-repeat mask making process, a set of disconnection devices or transfer circuits 118 at the bus interface, an array disconnect control 120 to control disconnection of the array from the bus 115, a decoder 204, memory enable logic 205, memory control logic 206, clock enable circuit 109, and clock driver circuits 110. Each array also includes an array inhibit logic circuit comprising switching transistors 255 and 263, NOR gate 258, and inverter gate 257.

Each subarray comprises a memory storage element in the form of a two-phase, three-clock, dynamic shift register 501–508, an address storage register 511–518, compare means 601–608, address match flip-flop 611–618, state register 531–538, and disconnect pad P1–P8. Also associated with each subarray are respective ones of OR gates 591–598, 551–558 and 561–568, and a respective one of data-out transfer circuits 571–578. A subarray inhibit logic circuit for each subarray includes respective ones of load transistors 621–628 and 631–638; switching transistors 661–668, 671–678, and 681–688; and subarray inhibit lines INH-$IN_1$ through INH-$IN_8$. For ease in depicting the internal arrangement of an array, only subarrays 1, 2, and 8 have been shown in FIG. 4.

Input signals are transferred to each array via the input bus 115. Diffused runs 345 connect the $V_{SS}$ and $V_{GG}$ signals from the input bus 115 to the internal portion of the array. Diffused run 344 is a shared signal line over which serial address and data-in signals are transmitted to the interior of the array via transfer circuits 118. Diffused runs 117 connect the command signals to the decoder 204 via transfer circuits 118. Further diffused runs 213 connect the clock signals CLP,CL1, and CL2 to the clock driver circuits 110.

Data-out signals are transferred from each subarray over the data-out bus 53 via the data-out transfer circuits 571–578.

All arrays are initially (upon fabrication) disconnected from the central input bus 115, the transfer circuits being disabled by a ZAP signal. During initial wafer testing, operative arrays are connected to the bus 115 by the disconnect control 120. The disconnect control 120 is responsive to a connect voltage applied from an external source such as a multiprobe tester (not shown) to a probe pad PA to generate and transfer a ZAP′ signal to the transfer circuits 118. The ZAP′ signal enables the transfer circuits 118, allowing transfer of input signals from the bus 115 to the array, thereby connecting the array. Defective arrays are left disabled by the ZAP signal. Details of the transfer circuits 118 and their operation may be found in the above-referenced U.S. Pat. application Ser. No. 307,317.

In addition, all subarrays 1–8 are initially (upon fabrication) disconnected from the data-out bus 53, the transfer circuits 571–578 being disabled by a ZAP signal. During the wafer testing procedure, operative subarrays are connected to the data-out bus 53 by applying a connect voltage from an external source to respective ones of probe pads P1-P8. ZAP′ signals applied to the operative subarrays allow transfer of output data signals to the data-out bus 53. Defective subarrays are left disabled by the ZAP signal. Details of the operation of the subarray transfer circuits 571–578 are given below with regard to the description of the operation of the circuitry shown in FIG. 10.

Decoder 204 is a 3x8 decoder of known construction which decodes 3-bit binary words received over command lines 117 into six possible commands (two of the eight possible outputs are unused): READ, WRITE, REFRESH, INITIALIZE, SET FREE, and STORE ADDRESS. The first three decoded commands are transmitted over lines 215 to memory enable logic 205, while the remaining three decoded commands are transmitted over bus 216 for distribution to the respective state registers 531–538 of the subarrays.

The state register of any particular subarray is in the FREE state prior to the addressing of the subarray. State registers 531–538 can also be set in the FREE condition at any other time by either an INITIALIZE command, or by a SET FREE command coinciding with an address MATCH output from the respective address match flip-flops 611–618.

When all subarrays within higher order arrays have been used and it is desired to store data in the array depicted in FIG. 4, the state register 531 associated with subarray 1 transmits a SAR enabling signal to AND-gate 591, thereby enabling it to pass the incoming serial address signals received over address line segment 539 into address register 511. According to the preferred embodiment, data and address signals are multiplexed over a single input line 344.

Figure 8:
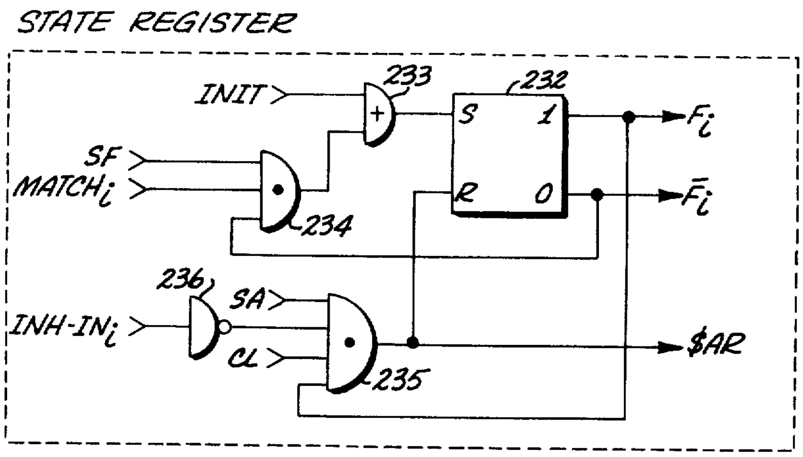
FIG. 8 is a detailed schematic diagram of one of the circuit elements shown in FIG. 4.

Referring momentarily to FIG. 8, a representative state register is depicted comprising a J-K flip-flop 232, AND-gates 234 and 235, OR-gate 233, and inverter 236, all of known construction. The SAR signal is transmitted by the state register under the logical condition: INH-IN′.SA.FREE.CL. That is, the subarray associated with the depicted state register must be in the FREE state, uninhibited by higher order arrays or higher order subarrays, and must have received the STORE ADDRESS command coincidentally with a CL clock signal. (The designations A′ and $\bar{A}$, representing the inverse of A, are used interchangeably throughout the ensuing description.)

The subarray address registers 511-518 are recirculating shift registers. By means of the inhibit chain, described hereinafter, one and only one subarray within a particular assembly or group of assemblies (embodiment of FIG. 2) is enabled to store a unique address assigned to it during data processing operations. Subsequently, when it is desired to apply one of the six possible commands to the addressed subarray, the address stored in the subarray address register is rotated in sequence with the serial address received over line segment 539 and compared in the respective comparing means 601–608.

Viewing subarray 1, address match flip-flop 611 is initially set in the $MATCH_1$ condition prior to the address compare. If, during the comparison process, compare means 601 detects a lack of coincidence between the stored address and the received address, an output signal is generated to reset the flip-flop 611 to thereby transmit a $MATCH_1$′ signal over line segment 541 to memory enable logic circuitry 205 and to state register 531. If, on the other hand, the stored address is identical to the incoming address, flip-flop 611 will generate a $MATCH_1$ signal. Subarray address registers 511–518 are so arranged as to rotate their contents in parallel with one another in response to address information being transmitted over line segment 539.

Memory enable logic 205, responsive to either or both a $MATCH_1$ signal and a $FREE_1'$ signal, generates control signals which are transmitted to the memory control logic 206 and to the clock enable circuit 109. The $FREE_1'$ signal is generated by the flip-flop of state register 531 under the same conditions as the SAR signal is generated. The control signals developed by the memory enable logic 205 and transmitted to the memory control logic 206 and clock enable circuit 109 will be described in detail below with reference to FIG. 7.

The clock enable circuit 109 is responsive to the control signals generated by the memory enable logic 205 to generate a CLOCK ENABLE (CE) signal which in turn enables the clock driver circuits 110 to pass CLOCK-P, CLOCK-1, and CLOCK-2 signals from the input bus 115 to the subarray shift registers 501–508 via clock signal bus 348 and AND-gates 551–558.

The memory control logic 206 is responsive to the control signals generated by the memory enable logic 205 and to the DATA-IN (DI) signals during a WRITE operation to gate data (DI) to the particular one of shift registers 501–508 which has been enabled by the MATCH signal of its respective address match flip-flop. During a READ operation the control logic 109 transfers DUMP' and DOUT' signals to the enabled shift register. The shift register is responsive to the DUMP' and DOUT' signals to transfer the stored contents of the shift register serially to the data-out bus 53 as the SA and SB signals, and concurrently to save the stored data by recirculating the data through the shift register. Data is shifted serially through the shift register under control of the CLP,CL1 and CL2 clocks.

Referring still to FIG. 4, the operation of the inhibit circuitry at the array and subarray levels will now be described. The array inhibit circuitry, comprising switching transistors 255 and 263, NOR gate 258, and inverter gate 257, exists for each array and is described more particularly with respect to FIG. 6 below. Looking now at a particular subarray inhibit circuit, for example that comprising load transistors 621 and 631 and switching transistors 661, 671, and 681, it will be seen that when transistor 681 is nonconductive, $V_{GG}$ potential (less the drop through load transistor 631) is applied over the line 691 as an $INH\text{-}IN_1$ signal, The $INH\text{-}IN_1$ signal is an inhibit signal and is applied to the state register 531 of the first subarray. For transistors 681 and 671 to be in their conductive states, subarray 1 must be an operative array (i.e., it must have been activated by a $ZAP_1'$ during the fabrication process), and it must be in the FREE state, represented by an $F_1$ signal output of state register 531. Thus subarray 1 is not inhibited until it changes from the FREE state to the FREE' state, assuming that it was shown to be a good subarray and the $ZAP_1'$ signal was applied to it. If the subarray was initially shown to be defective, and a $ZAP_1$ signal applied to it, subarray 1 will continually remain inhibited by a $INH\text{-}IN_1$ signal over line 691.

When subarray 1 switches from the FREE state to the FREE' state, and transistor 671 becomes nonconductive, $V_{GG}$ potential (less the drop through load transistor 621) is applied over line 641 to transistor 661, turning it on. Assuming that subarray 2 is initially in the FREE state, with transistor 682 being conductive, $V_{GG}$ potential (less the drop through transistor 632) is applied through transistors 682 and 661, over subarray inhibit line 269, and out over the array inhibit bus 245 (described with regard to FIG. 6 below). When subarray 2 switches from the FREE to the FREE' state, transistors 672 and 682 become nonconductive. The $INH\text{-}IN_2$ signal is applied to subarray 2 over line 692, and transistor 662 in subarray inhibit line 269 is turned on by load transistor 622.

The operation of the remaining subarrays within the array depicted in FIG. 4 is identical to the operation of the first two subarrays. When all eight subarrays have been switched to the FREE' state, the output of NOR gate 258 becomes a logical 1 and turns on switching transistor 263 in the array inhibit bus. The function of transistor 263 will be described below with regard to FIG. 6.

The function of transistor 661 in the subarray inhibit line 269 is to block the conductive path from any of load transistors 632–638 associated with the subarrays "lower" in the chain. For example, although subarray 2 is in the FREE state, and transistor 682 is conductive, subarray 2 remains inhibited by the $INH\text{-}IN_2$ signal, since no conductive path along subarray line 269 exists until subarray 1 goes to the FREE' state and transistor 661 becomes conductive.

The circuit elements of the array depicted in FIG. 4 will now be described in detail. The decoder 204, memory enable logic 205, and memory control logic 206 are substantially identical to those shown and described with regard to the cross-referenced application entitled "Variably Addressable Semiconductor Mass Memory". It will be understood that the input of a FREE, FREE', MATCH, or MATCH' signal to the memory enable logic 205 or memory control logic 206 now encompasses FREE, FREE', MATCH, or MATCH' signals, respectively, from any of the subarrays within the illustrated array. The memory enable logic 205 serves all of the subarrays comprising the array, and it generates the appropriate enabling signals to memory control logic 206 whenever FREE' and MATCH signals are received from any subarray.

The memory control logic 206 distributes the appropriate shift register control signals over bus 347 to each of the shift registers 501–508 via the respective AND gates 561–568. These signals are applied to a particular shift register only when a corresponding MATCH signal has enabled the associated AND gate. For example, memory control signals are transmitted to shift register 501 only when AND gate 561 has been enabled by a $MATCH_1$ signal from the address match flip-flop 611, indicating that subarray 1 has been addressed.

Clock driver 110 applies CLP,CL1, and CL2 clock signals over bus 348 to the respective AND gates 551–558 associated with shift registers 501–508. Again, these clock signals are gated into the desired shift register by an enabling MATCH signal generated by the address match flip-flop associated with a correctly addressed subarray.

Figure 7:
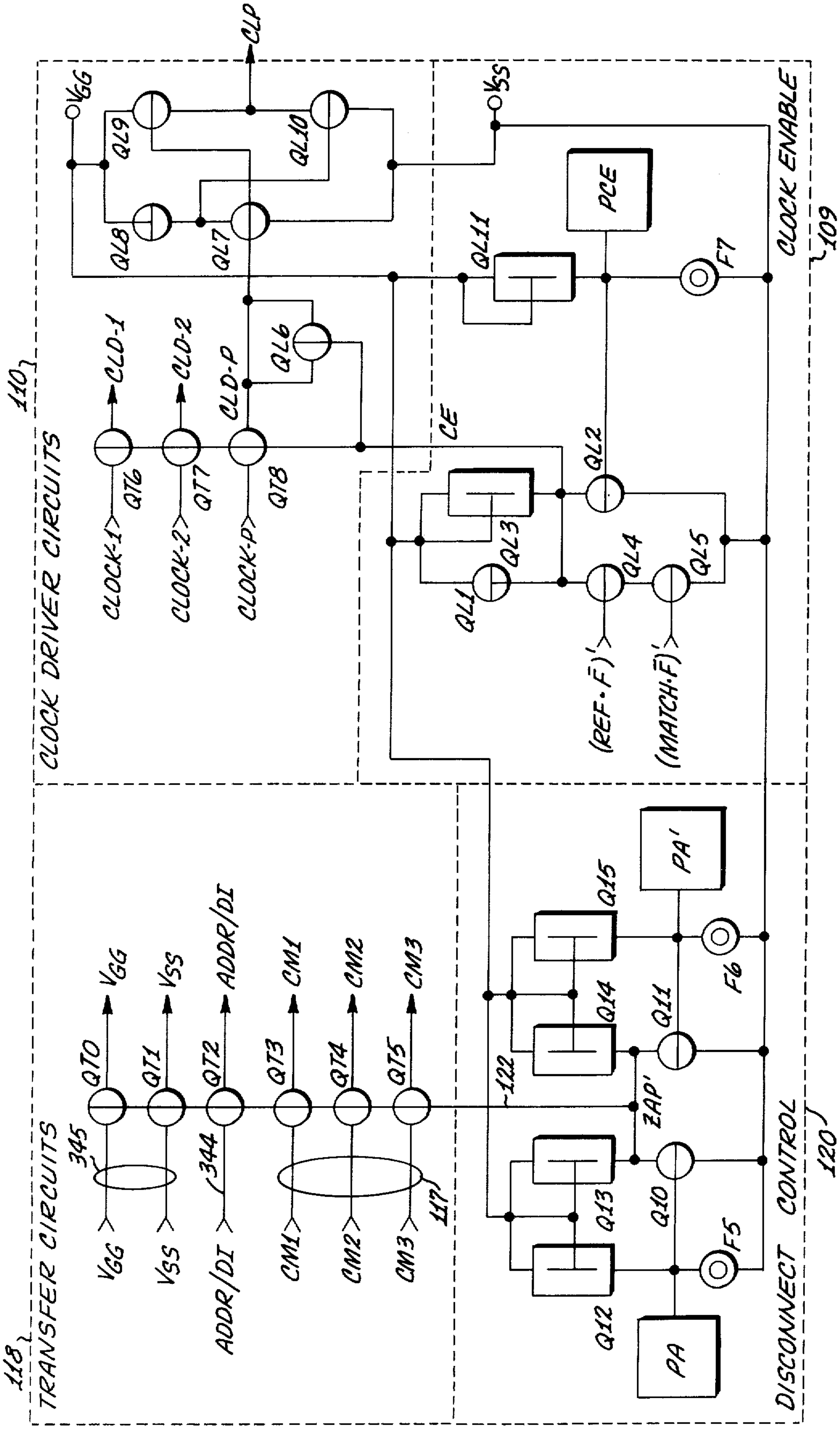
FIG. 7 is a detailed schematic diagram of several of the circuit elements shown in FIG. 4.

Details of the disconnect control 120 and the transfer circuits 118 are shown on the left-hand side of FIG. 7. A dual disconnect circuit comprising transistors F5,F6 and Q10–Q15 is shown. Probe pads PA and PA' are connected, respectively, to the drains of floating gate devices F5 and F6. Although a dual disconnect circuit is shown, the operation of only one of the identical circuits is described. F5 is normally off (i.e., no charge on the gate), when the array is tested after wafer manufacture. With F5 off, $V_{GG}$ potential (less the drop through load device Q12) is applied to the gate of Q10. Q10 conducts, enabling a ZAP signal level (logical "0") on the drain of Q10. The Q10 drain is connected to a polysilicon run 122, which forms the gates of switching transistors QT0–QT5. The ZAP signal disables QT0–QT5 preventing the transfer of input signals from the bus to the array through the transfer circuits. During array testing, $V_{SS}$ potential is temporarily applied via probe pad PA to the gate of Q10 turning Q10 off and applying $V_{GG}$ potential less the load Q13 drop (ZAP' enable signal) to the gates of QT0–QT5. With the transfer circuits QT0–QT5 enabled the array address match logic 106 will respond to an all "0" ($V_{SS}$ potential) address on the shared data/address line 344, and data (DATA-IN,QT2) can be written, read back, and compared to test the subarrays of the array, provided that the array is responsive to the appropriate command signals input over lines 117, and provided that the inhibit chain is temporarily disabled to permit testing of a single array.

Upon determining the array good, an avalanche charge is applied to the pad PA, injecting electrons onto the floating gate of transistor F5, turning it on. Q10 is turned off by F5 conducting and a semipermanent ZAP' enable signal level is applied to the gates of transfer transistors QT0–QT5.

Referring still to FIG. 7, a separate clock-enable disconnect circuit comprising floating gate transistor F7, avalanche pad PCE, and load transistor QL11 is shown. As with the previously described disconnect control circuit, F7 conducting (i.e., electrons injected onto the gate of F7) turns QL2 off, applying a CE clock enable level to the gates of QT6–QT8. The clock-enable disconnect circuit F7,PCE,Q11 is redundant, as is the alternate disconnect control F6,PA',Q15. Both of the redundant circuits may be eliminated (as in FIG. 4) by deleting the redundant circuit elements and connecting the gate of Q10 (ZAP) directly to the gate of QL2. The purpose of the redundant disconnect circuits is to minimize the probability of critical failure whereby the transfer circuits QT0–QT8 cannot be turned off.

Still referring to FIG. 7, the transfer transistors QT6–QT8 of the clock driver circuits are enabled by the CE clock-enable signal if the array is good (i.e., PCE on, QL2 off) and both QL4 and QL5 are off.

$$CE = PCE\ (MATCH + REF)$$

$$CE' = PCE' + (MATCH'\ REF')$$

Thus, the CLD-1, CLD-2, and CLD-P clock signals are enabled, respectively, through transfer transistors QT6–8 if an array is good (QL2 off) and a MATCH signal is generated in response to an identity between the incoming address signals ADDR and the unique address of a subarray. The clocks are generated for a complete subarray cycle, i.e., a sufficient number of clocks to fill the subarray shift register with new data during a read operation or to read out the entire stored contents during a write operation. Partial cycles could of course be performed; however, data block positioning information must then be maintained by the management control subsystem or by additional logic implemented in the auxiliary store or controller.

During any valid data cycle, READ or WRITE, only one subarray in each assembly is operating at maximum system frequency; all others are ordinarily dormant. The signal levels stored in the capacitive elements of the preferred embodiment of the shift register described hereinafter require periodic refreshing or regeneration to prevent dissipation or leakage of the stored charges. Accordingly, a REFRESH signal is provided which enables the CE signal simultaneously for all subarrays in the assembly on a periodic basis (e.g., every 2 ms in the preferred embodiment).

The CLD-1,2,P clock signals are each transferred to a separate clock driver, only one of which (the CLD-P circuit) is shown in FIG. 7. The exemplary clock driver comprises input transistors QL7 and QL9, the latter operating push-pull with QL10. The clock drivers, operating in push-pull mode, draw DC power only for the duration of the clock pulse. Standby power (clocks off), therefore, is negligible and due only to leakage current. A transistor QL8 is connected gate-to-source to provide a non-linear load resistance. The input to QL7 and QL9 is bootstrapped by transistor QL6 connected (source to drain) as a voltage-dependent capacitor to improve the clock signal amplitudes. QL6 charges to approximately $V_{GG}$ potential (less the threshold drop) through QL3 when no clock pulse is present at the source of QT21. When CLOCK-P is applied to QT8, the stored charge boosts the amplitude of the CLD-P input to QL7. A protective device QL1, connected as a reverse diode provides a discharge path to $V_{GG}$.

Figure 10:
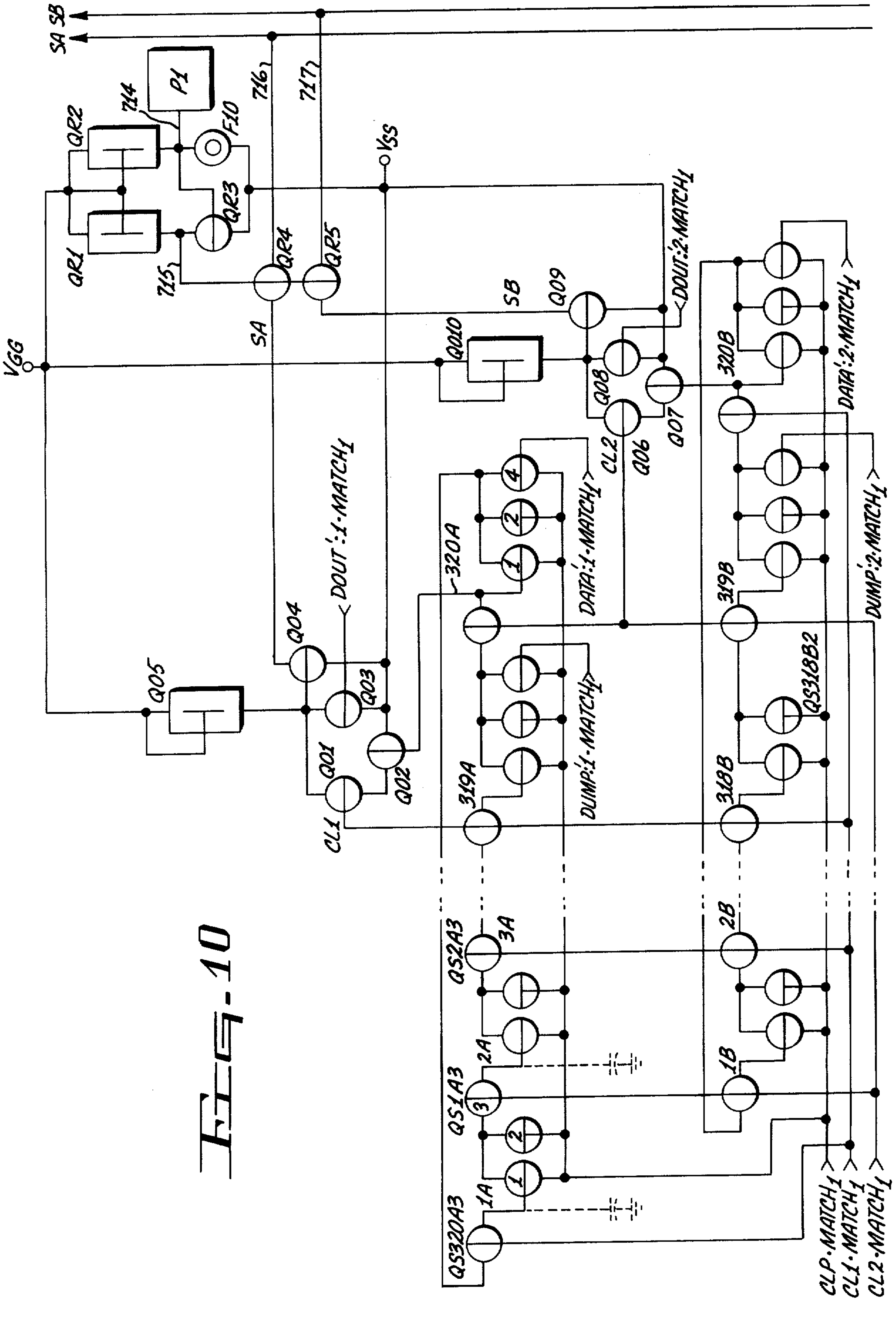
FIG. 10 is a detailed schematic diagram of one of the circuit elements shown in FIG. 4.

Referring now to FIG. 10, a representative shift register (501, FIGS. 4 and 5) and the associated output driver circuits are shown in detail. The shift register of FIG. 10 employs two-phase, three clock, dynamic ratioless logic in a multiplexed dual-bank 320-bit register, 160 bits of storage per bank. The two banks are evident in the layout of FIG. 10, one bank bearing literal designations of reference A; the other, B. Only representative ones of the shift register transistors are shown and labelled on FIG. 10. For example, transistor QS (labelled with a small 3 inside the symbol) is to the right of and connected to QS1A2 and QS1A1. Storage nodes consist of the parasitic capacitances of the runs interconnecting the transistors. Two representative storage nodes labelled 1A and 2A are shown as phantom capacitors with dashed lines. One bit of storage requires six transistors in two stages, a storage stage and an inverter stage, as for example, storage stage 1A comprising transistors QS1A1-QS1A3 and inverter stage 2A comprising transistors QS2A1–QS2A3.

For details of the operation of shift register 112 reference may be had to the aforementioned U.S. Pat. application Ser. No. 307,317, wherein the operation of the shift register disclosed is identical to that in the present invention.

Still referring to FIG. 10, the disconnect control circuitry associated with shift register 501 will now be described. The circuitry and operation of the disconnect control elements of the remaining subarrays is identical to that of subarray 1. Probe pad P1 is connected to the drain of floating gate device F10. F10 is normally off after completion of wafer manufacture. With F10 off, $V_{GG}$ potential (less the drop through load device QR2) is applied to the gate of QR3. QR3 conducts enabling a ZAP signal level (logical 0) on the drain of QR3. The QR3 drain is connected to a polysilicon run 715, which forms the gates of switching transistors QR4 and QR5.

The ZAP signal disables QR4 and QR5 preventing the transfer of data-out signals from the shift register 501 to data-out bus 53 through the transfer circuits. During array testing, $V_{SS}$ potential is temporarily applied via probe pad P1 to the gate of transistor QR3 turning QR3 off and applying $V_{GG}$ potential less the load QR1 drop (ZAP' enable signal) to the gates of QR4 and QR5, allowing data to be read out of shift register 501 during the subarray testing process.

Upon determining that subarray 1 is good, an avalanche charge is applied to pad P1, injecting electrons onto the floating gate of transistor F10, turning it on. QR3 is turned off by F10 conducting and a semipermanent ZAP' enable signal level is applied to the gates of output transfer transistors QR4 and QR5.

Figure 6:
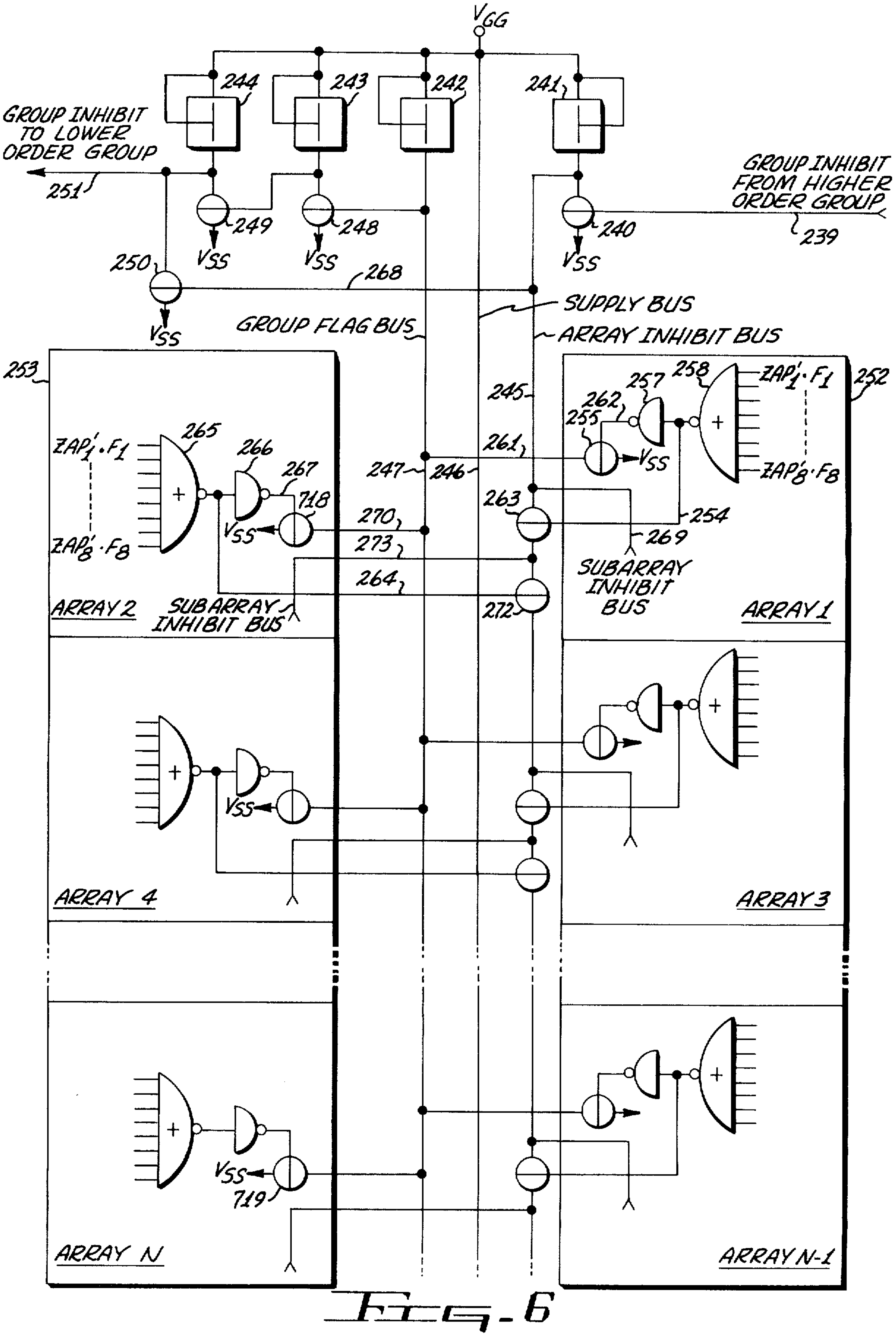
FIG. 6 is a detailed schematic diagram of an inhibit circuit interconnecting several arrays.

Referring now to FIG. 6, a preferred embodiment of the array inhibit logic is shown in schematic form. Assume initially that the N arrays shown in FIG. 6 are all in the FREE state and that an inhibit signal is being transmitted to the group of N arrays over line 239 from the next higher order group. According to the logic used in the FIG. 6 schematic, a zero voltage on line 239 represents an inhibit condition in the inhibit chain above the depicted group of N arrays, while a minus one voltage on line 239 represents a non-inhibit condition, in which all higher order arrays are in the FREE' state.

Transistor 240 is non-conductive when a zero, indicating an inhibit condition, is transmitted over line 239 from a higher order group. When transistor 240 is non-conductive, transistor 241 generates a one over line 268 turning transistor 250 on, and opening a conductive path to $V_{SS}$ for transistor 244. Thus, regardless of the state of any of the N arrays, a zero is transmitted over line 251 to the next lower group. When a one, indicating a non-inhibit condition, is transmitted over line 239 from a higher order group, transistor 240 becomes conductive and transistor 250 becomes non-conductive. Whether a 0 or a 1 is transmitted over line 251 to the next lower group is dependent upon the state of arrays 1 through N of the group shown in FIG. 6, and upon the state of the subarrays 1 through 8 of each array, as will now be shown.

When transistor 240 is conductive, because of a one transmitted over line 239, transistor 631 of subarray 1 (see FIG. 4) generates either a one, representing an INH-IN$_1$ signal, over line segment 691, or a one through transistor 681 out over subarray inhibit line 269 and array inhibit bus 245, and eventually through transistor 240 to $V_{ss}$, depending upon whether transistor gate 681 is off or on, respectively. As described above with regard to FIG. 4, transistor 681, together with transistor 671, becomes conductive only when subarray 1 is both FREE and operative (i.e. ZAP' condition). Thus when subarray 1 of array 1 is both an operative subarray and FREE, the INH-IN$_1$ signal is dropped on line 691, and the subarray may be set in the FREE' state by application of a STORE ADDRESS signal over command lines 117.

While the INH-IN$_1$ signal is down in subarray 1 and before subarray 1 is set to the FREE' state, all other subarrays in array 1 and in all other arrays of the group depicted in FIG. 6 are kept inhibited. So long as any subarray in array 1 is both enabled and FREE (ZAP'·F), the output of NOR gate 258 remains a logical 0, causing switching transistor 263 of the array inhibit bus 245 to remain off. No other load transistors in the arrays lower in the chain, corresponding to transistors 631–638 of array 1, can conduct through the array inhibit bus 245 to $V_{ss}$. Thus all lower subarrays in the chain are kept inhibited.

When subarray 1 (see FIG. 4) is set into the FREE' state, switching transistors 681 and 671 are turned off, gate 661 becomes conductive, and the INH-IN$_2$ signal on line segment 692 of subarray 2 is dropped, assuming subarray 2 is both operative and FREE. Subarray 2 may now store an address and be set in the FREE' state, eventually making transistor gate 662 conductive. The other subarrays 3 through 8 are similarly addressed one-by-one in succession, until all have been switched to the FREE' state. When all 8 subarrays within array 1 are in the FREE' state, a logical one output from NOR gate 258 turns on switching gate 263 in the array inhibit bus 245. At this point a conductive path to $V_{ss}$ through transistor gate 240 is opened up for the first FREE subarray of array 2. The operation of the subarray inhibit circuitry of array 2 and arrays 3-N is identical to that described with regard to array 1. The subarrays in arrays 2 through N are addressed one-by-one in succession, until all have been switched to the FREE' state.

When all subarrays of all N arrays are in the FREE' state, load transistor 242 no longer has a conductive path to $V_{ss}$ over the group flag bus 247 through gates such as switching transistor 255 of array 1, which is enabled by the logical one output of inverter gate 257 when any input to NOR gate 258 in ZAP'·F. As each array 1-N has its subarrays switched to the F' state, its associated switching gate for grounding the group flag bus 247 (e.g., gate 255 of array 1, gate 718 of array 2) is turned off. When finally the last subarray of array N becomes F' and the grounding gate 719 is switched off, gate 248 is turned on, load transistor 243 conducts to $V_{ss}$, transistor 249 is turned off, and load transistor 244 conducts a 1, representing a non-inhibit condition, over line 251 to the next lower order group of arrays. At this juncture, all subarrays in the N arrays, as well as all subarrays in the arrays in the chain above, are either FREE' or in the disconnected state (ZAP signal).

Assume now that during the addressing of the subarrays within the depicted N arrays it is desired to SET FREE subarray 1 of array 1 and to assign it a new address. Upon receipt of the SET FREE command, subarray 1 assumes the FREE$_1$ state (see FIG. 4), the INH-IN$_1$ signal is dropped on line segment 269 of subarray 1, the output of NOR gate 258 becomes a logical 0, and gate 263 of the array inhibit bus 245 is shut off, preventing any subarrays lower in the chain from responding to the STORE ADDRESS signal. When subarray 1 has reassumed the FREE$_1$' state, gate 263 again becomes conductive, and the next lower FREE subarray in the chain may be assigned an address.

Figure 5A:
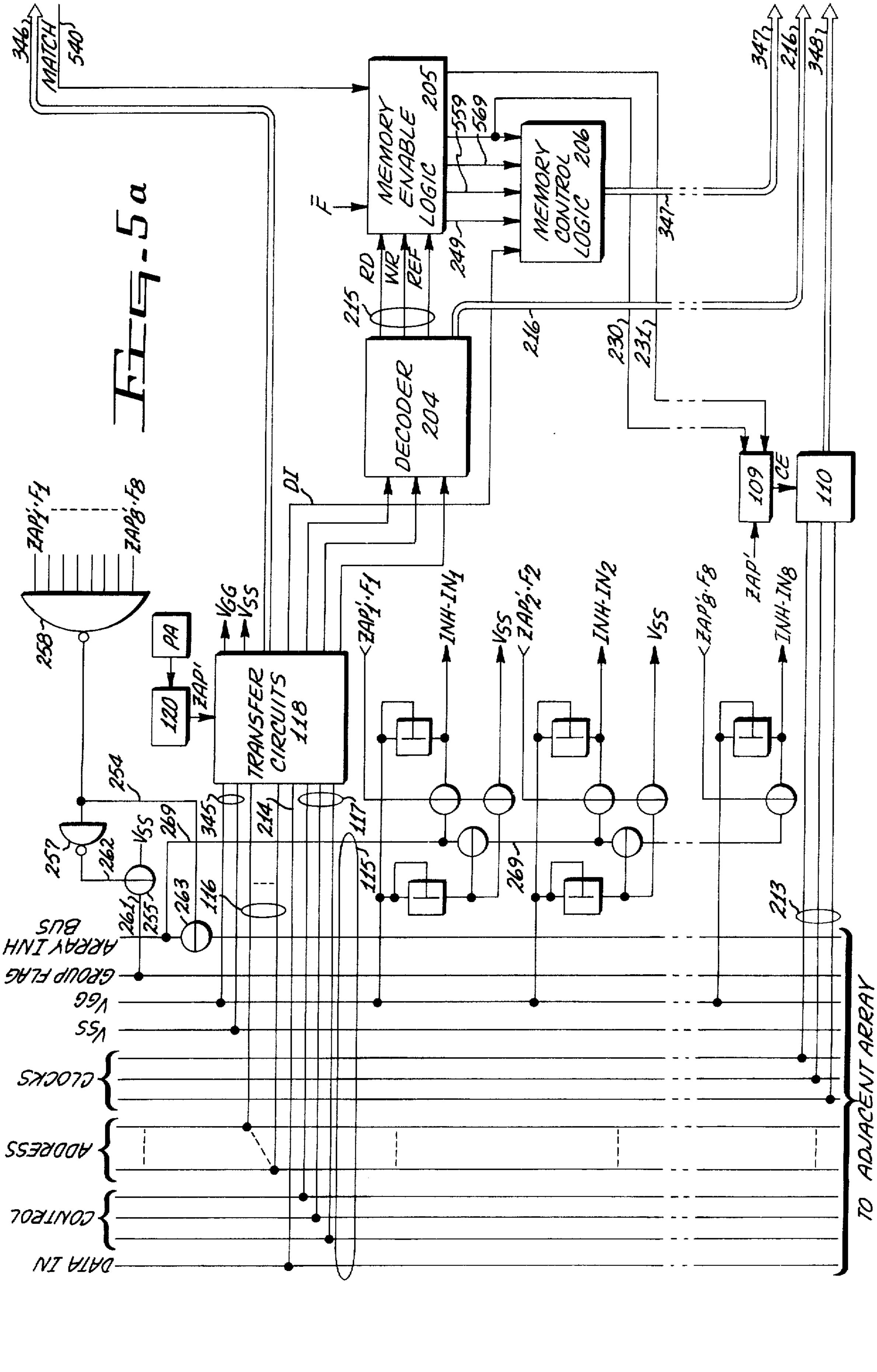
FIG. 5, composed of FIGS. 5*a* and 5*b*, is a schematic block diagram of an alternative embodiment of an array.
Figure 5B:
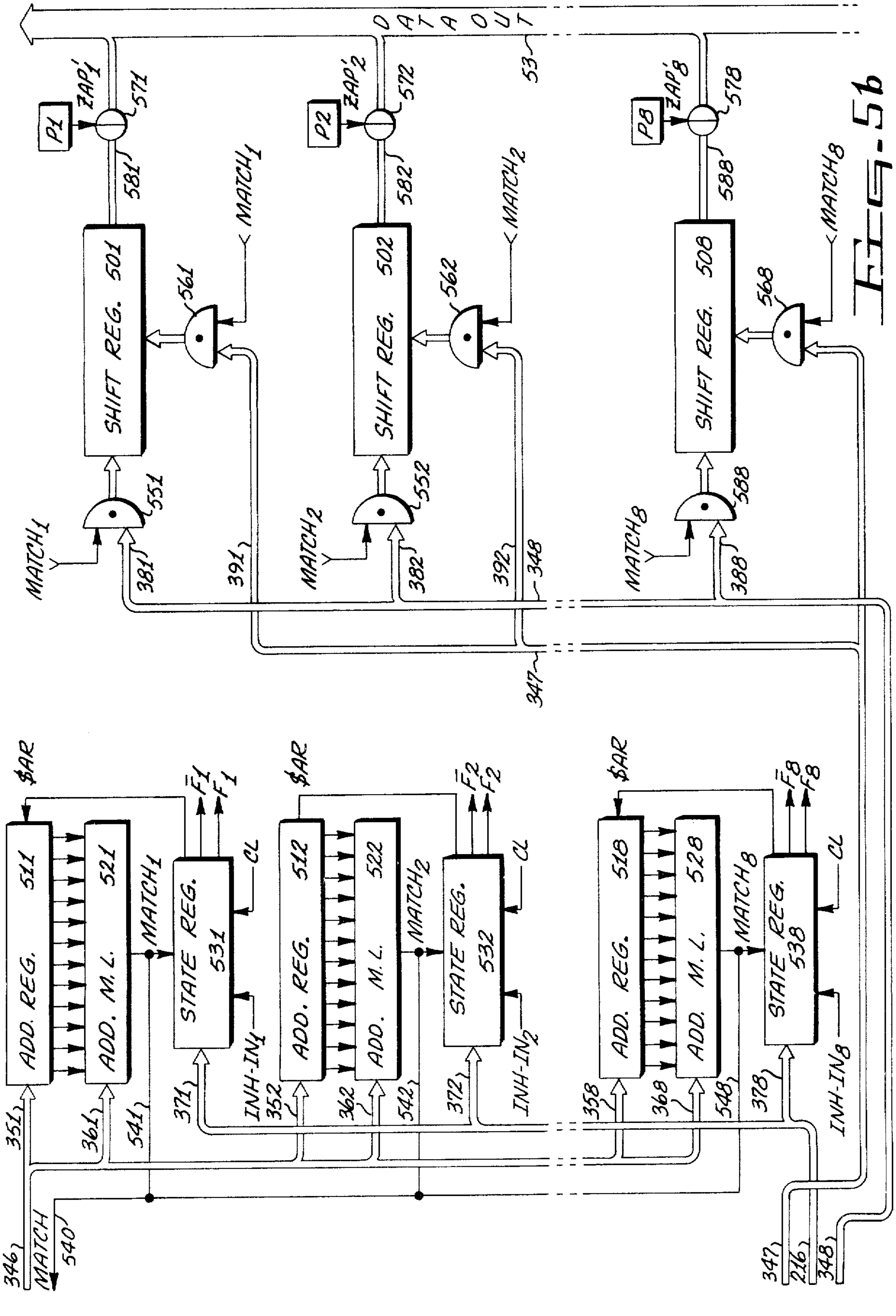

In FIGS. 4, 5 and 6 the array inhibit circuitry and the subarray inhibit circuitry are shown located within the central bus portion 115; however, these circuits may be situated within the subarrays themselves if so desired. Further the group flag bus 247, whose function is to speed the propagation of an inhibit signal along the inhibit chain, may be eliminated if desired.

FIG. 5 illustrates an alternative embodiment of an array, in which parallel addressing is employed. According to this arrangement address signals are received in parallel over address lines 116 and transmitted through transfer circuits 118 over address bus 346 to the address registers 511–518 and the address match logic circuitry 521–528 of the 8 subarrays. Data information is transmitted over data line 214 through transfer circuits 118 to memory control logic 206.

Figure 9:
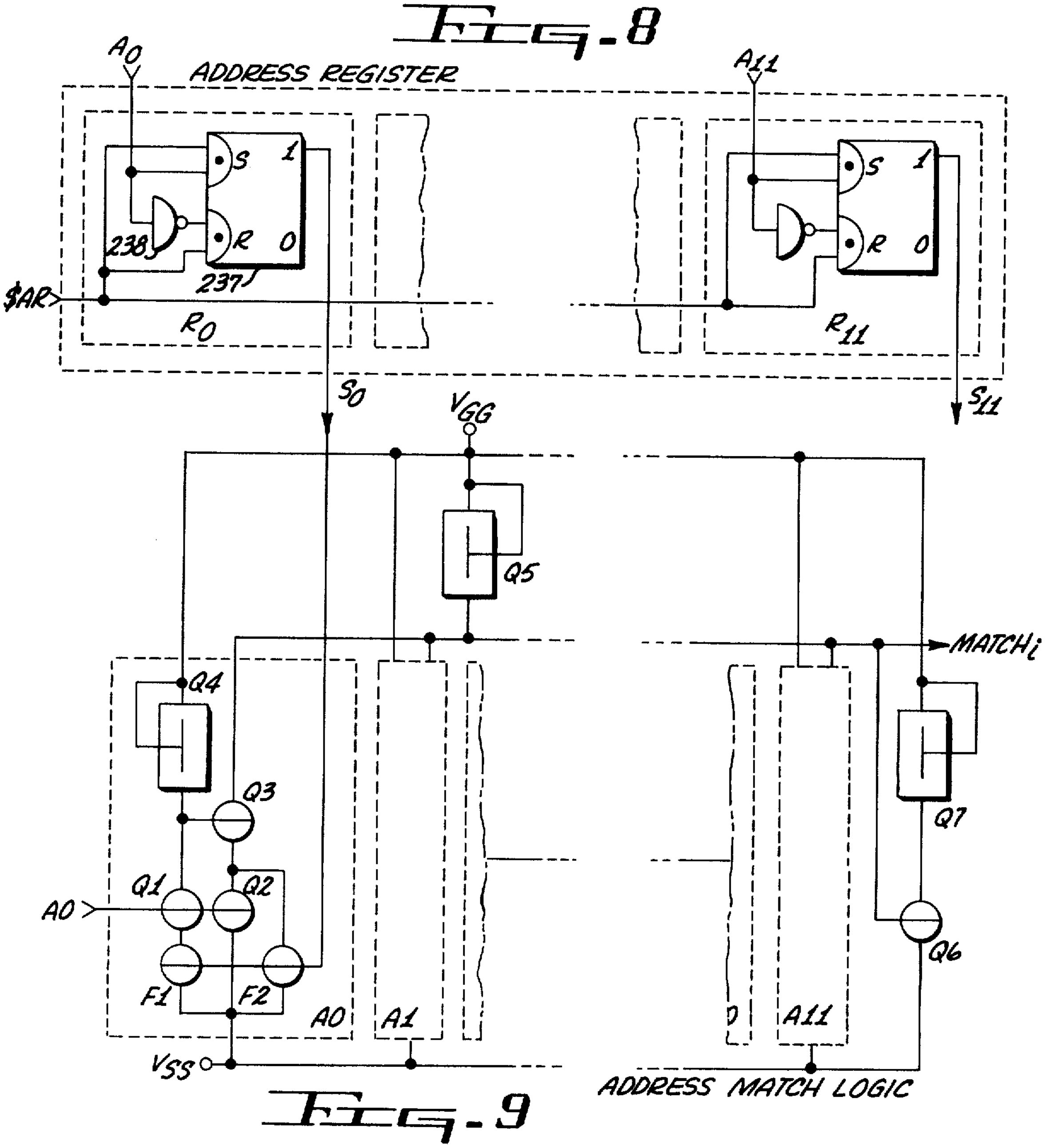
FIG. 9 is a detailed schematic diagram of several of the circuit elements shown in FIG. 5.

Referring to FIG. 9, an illustrative address register comprises a number of identical register stages $R_0$–$R_{11}$. Each stage includes a J-K flip-flop 237 having AND set and reset input gates. An inverting gate 238 inverts the incoming address signal prior to its input to the reset AND gate. Flip-flop 237 of register stage $R_0$ will be set to a logical 1 upon the coincidence of a SAR signal and a logical 1 in address bit position $A_0$. The operation of register stages $R_2$–$R_{11}$ is identical to that of register stage $R_0$. When any register stage $R_0$–$R_{11}$ is set with a logical 1, a logical 1 appears continuously as an output over the corresponding one of output lines $S_0$–$S_{11}$.

During an auxiliary store access of a subarray of the array depicted in FIG. 5, if the incoming $A_0$–$A_{11}$ address signals match the stored signals $S_0$–$S_{11}$ of the subarray, a MATCH signal is generated by the address match logic and transmitted to the state register and memory enable logic 205. The MATCH signal generated by the representative address match logic of FIG. 9 serves an identical purpose to that generated by the address match flip-flop of a subarray, as depicted in FIG. 4. In FIG. 5, the SAR signal generated by the state register is applied to the address register to enable it to store an incoming address received over address bus 346. In all other respects, the operation of the array shown in FIG. 5 is identical to that shown in FIG. 4.

It will be apparent to those skilled in the art that the disclosed multiple register variably addressable semiconductor mass memory may be modified in numerous ways and may assume many embodiments other than the preferred form specifically set out and described above. For example, the shift register may be implemented with charge-transfer dynamic devices thereby greatly reducing the array size and increasing circuit speed. The preferred devices utilized for disconnect control and address programming are electrically reprogrammable elements. Other forms of programmable elements such as fusible link devices may be utilized. Further, other types of electrically reprogrammable elements such as metal alumina oxide semiconductor (MAOS) and MNOS devices may be used as well. Accordingly, it is intended by the appended claims to cover all modifications of the invention which fall within the true spirit and scope of the invention.

What is claimed is:

1. An integrated-circuit store comprising a body of semiconductor material having formed thereon a plurality of basic circuits as a common substrate, each of said basic circuits comprising:

a bus portion including at least one signal line sharing address and data information, and a control signal line, said bus portion interconnecting said plurality of basic circuits;

a plurality of first means for storing data signals;

a plurality of second means each capable of storing a different address;

means for enabling one of said plurality of second storage means to store a unique address transmitted over said shared signal line;

means for controlling the transfer of data signals between said shared signal line and one of said first storage means;

means responsive to a comparison between address signals received over said shared signal line and said stored address for actuating said controlling means;

second means for connecting said shared signal line to said actuating means and to said plurality of first storage means;

means for disabling said second connecting means to thereby disconnect said one basic circuit from said signal bus; and means responsive to the status of all other basic circuits and all other of said plurality of second storage means for alternatively inhibiting or actuating said enabling means, whereby one and only one of said second storage means is enabled to store a unique address at any given time.

2. An integrated-circuit store according to claim 1, wherein said second connecting means comprises one or more fuses.

3. An integrated-circuit store comprising a body of semiconductor material having formed thereon a plurality of basic circuits as a common substrate, each of said basic circuits comprising:

a bus portion including at least one address signal line, a data signal line, and a control signal line, said bus portion interconnecting said plurality of basic circuits;

a plurality of first means for storing data signals;

a plurality of second means each capable of storing a different address;

means for enabling one of said plurality of second storage means to store a unique address transmitted over said at least one address signal line;

means for controlling the transfer of data signals between said data signal line and one of said first storage means;

means responsive to a comparison between address signals received over said at least one address signal line and said stored address for actuating said controlling means;

second means for connecting said address signal line to said actuating means and for connecting said data signal line to said plurality of first storage means;

means for disabling said second connecting means to thereby disconnect said one basic circuit from said signal bus; and means responsive to the status of all other basic circuits and all other of said plurality of second storage means for alternatively inhibiting or actuating said enabling means, whereby one and only one of said second storage means is enabled to store a unique address at any given time.

4. An integrated-circuit store according to claim 3, wherein said second connecting means comprises one or more fuses.

5. An integrated-circuit store comprising a body of semiconductor material having formed thereon a plurality of basic circuits as a common substrate, each of said basic circuits comprising:

a bus portion including a shared signal line over which address and data-in signals may be transmitted, a control signal line, and a data-out line, said bus portion interconnecting said plurality of basic circuits;

a plurality of first means for storing data signals;

a plurality of second means each capable of storing a different address;

means for enabling one of said plurality of second storage means to store a unique address transmitted over said shared signal line;

means for controlling the transfer of data-in signals between said shared signal line and one of said first storage means;

means responsive to a comparison between address signals received over said shared signal line and said stored address for actuating said controlling means;

second means for connecting said shared signal line to said actuating means and to said plurality of first storage means;

means for disabling said second connecting means to thereby disconnect said one basic circuit from said signal bus;

third connecting means for connecting said plurality of first storage means to said data-out line;

means for selectively disabling said third connecting means to thereby disconnect one or more of said plurality of first means from said data-out line; and means responsive to the status of all other basic circuits and all other of said plurality of second storage means for alternatively inhibiting or actuating said enabling means, whereby one and only one of said second storage means is enabled to store a unique address at any given time.

6. An integrated-circuit store comprising a body of semiconductor material having formed thereon a plurality of basic circuits as a common substrate, each of said basic circuits comprising:

a bus portion including at least one shared signal line over which address and data-in signals may be transmitted, a control signal line, and a data-out line, said bus portion interconnecting said plurality of basic circuits;

a plurality of shift registers for storing said data-in signals;

a plurality of address registers each capable of storing a different address, each of said address registers being associated with a different one of said shift registers;

means for enabling one of said plurality of address registers to store a unique address transmitted over said shared signal line;

means for controlling the transfer of data-in signals between said shared signal line and one of said shift registers;

means responsive to a comparison between address signals received over said shared signal line and said stored address for actuating said controlling means;

second means for connecting said shared signal line to said actuating means and to said plurality of shift registers;

means for disabling said second connecting means to thereby disconnect said one basic circuit from said signal bus;

third means for connecting said shift registers to said data-out line;

means for selectively disabling said third connecting means to thereby disconnect one or more of said shift registers from said data-out line; and means responsive to the status of all other basic circuits and all other of said plurality of address registers for alternatively inhibiting or actuating said enabling means, whereby one and only one of said address registers is enabled to store a unique address at any given time.

7. An integrated-circuit store comprising a body of semiconductor material having formed thereon a plurality of basic circuits as a common substrate, each of said basic circuits comprising:

a bus portion including a shared signal line over which address and data-in signals may be transmitted, a data-out line, and a control signal line, said bus portion interconnecting said plurality of basic circuits;

a plurality of first means for storing said data-in signals;

a plurality of second means for storing different addresses;

a plurality of third means connected to said control signal line each capable of storing at least one status signal, said plurality of first, second, and third storage means being so arranged that each of said first storage means has associated with it a unique one of said second and third storage means;

means responsive to each of said third storage means for selectively enabling the second storage means associated with it to store a unique address transmitted over said shared signal line;

means for controlling the transfer of data-in signals between said shared signal line and one of said plurality of first storage means;

means responsive to a comparison between address signals received over said shared signal line and said stored address for actuating said controlling means;

second means for connecting said shared signal line to said actuating means and to said plurality of first storage means, and for connecting said control signal line to said plurality of third storage means;

means for disabling said second connecting means, thereby disconnecting said one basic circuit from said signal bus;

third means for connecting said plurality of first storage means to said data-out line; and means for selectively disabling said third connecting means, thereby disconnecting one or more of said first storage means from said signal bus.

8. The integrated-circuit store according to claim 7, in which each of said first storage means comprises a shift register, each of said plurality of second means comprises an address register, and each of said plurality of third means comprises a flip-flop.

9. The integrated-circuit store according to claim 8, wherein said second and third connecting means comprise fuses.

10. An integrated-circuit store comprising a body of semiconductor material having formed thereon a plurality of basic circuits as a common substrate, each of said basic circuits comprising:

a bus portion including at least one signal line shared by address and data-in information, a data-out line, and a control signal line, said bus portion interconnecting said plurality of basic circuits;

a plurality of sub-circuits, each of said sub-circuits comprising:

first means for storing data signals;

second means for storing a unique address;

third means connected to said control signal line for storing at least one status signal;

means responsive to said third storage means for selectively enabling the second storage means to store a unique address transmitted over the shared signal line;

means for controlling the transfer of data signals between said shared signal line and any one of the first storage means of said sub-circuits;

means responsive to a comparison between address signals received over said shared signal line and said stored address for actuating said controlling means;

second means for connecting said shared signal line to said actuating means, and for connecting said control signal line to the third storage means of said sub-circuits;

means for disabling said second connecting means, thereby disconnecting said one basic circuit from said signal bus;

third means for connecting each of said first storage means to said data-out line; and means for selectively disabling any of said third connecting means, thereby disconnecting one or more of said first storage means from said signal bus.

11. An integrated-circuit store comprising a body of semiconductor material having formed thereon a plurality of basic circuits as a common substrate, each of said basic circuits comprising:

a bus portion including at least one address signal line, a data-in line, a data-out line, and a control signal line, said bus portion interconnecting said plurality of basic circuits;

a plurality of first means for storing data signals;

a plurality of second means each capable of storing a different address;

means for enabling one of said plurality of second storage means to store a unique address transmitted over said at least one address signal line;

means for controlling the transfer of data signals between said data-in line and one of said first storage means;

means responsive to a comparison between address signals received over said at least one address signal line and said stored address for actuating said controlling means;

second means for connecting said at least one address signal line to said actuating means, and for connecting said data-in line to said first storage means;

third means for connecting said data-out line to said first storage means;

means for disabling said second connecting means to thereby disconnect said one basic circuit from said signal bus;

means for selectively disabling said third connecting means to thereby disconnect one or more of said first storage means from said signal bus; and means responsive to the status of all other basic circuits and all other of said plurality of second storage means for alternatively inhibiting or actuating said enabling means, whreby one and only one of said second storage means is enabled to store a unique address at any given time.

12. An integrated-circuit store comprising a body of semiconductor material having formed thereon a plurality of basic circuits as a common substrate, each of said basic circuits comprising:

a bus portion including at least one address signal line, a data-in line, a data-out line, and a control signal line, said bus portion interconnecting said plurality of basic circuits;

a plurality of first means for storing data signals;

a plurality of second means for storing different addresses;

a plurality of third means connected to said control signal line each capable of storing at least one status signal, said plurality of first, second, and third storage means being so arranged that each of said first storage means has associated with it a unique one of said second and third storage means;

means responsive to each of said third storage means for selectively enabling the second storage means associated with it to store a unique address transmitted over said address signal line;

means for controlling the transfer of data signals between said data-in line and said plurality of first storage means;

means responsive to a comparison between address signals received over said at least one address signal line and one of said stored addresses for actuating said controlling means;

second means for connecting said at least one address signal line means to said actuating means, for connecting said data-in line to said plurality of first storage means, and for connecting said control signal line to said plurality of third storage means;

means for disabling said second connecting means, thereby disconnecting said one basic circuit from said signal bus;

third means for connecting said plurality of first storage means to said data-out line; and means for selectively disabling said third connecting means, thereby disconnecting one or more of said first storage means from said signal bus.

13. An integrated-circuit store having connected thereto from an external source means for transmitting address signals, means for transmitting data signals, and means for transmitting at least one control signal and adapted to receive address and control signals from said external source and to transfer data signals to and from said external source, said store comprising a body of semiconductor material, a plurality of basic circuits formed on said body of semiconductor material as a common substrate, and means for connecting said transmitting means to at least one of said plurality of basic circuits, each one of said basic circuits comprising:

a bus portion including at least one address signal line, a data signal line, and a control signal line, said bus portion interconnecting said plurality of basic circuits;

a plurality of first means for storing data signals;

a plurality of second means for storing different addresses;

a plurality of third means connected to said control signal line each capable of storing at least one status signal, said plurality of first, second, and third storage means being so arranged that each of said first storage means has associated with it a unique one of said second and third storage means;

means responsive to each of said third storage means for selectively enabling the second storage means associated with it to store a unique address transmitted over said address signal line;

means for controlling the transfer of data signals between said data signal line and one of said plurality of first storage means;

means responsive to a comparison between address signals received over said at least one address signal line and said stored address for actuating said controlling means;

second means for connecting said at least one address signal line means to said actuating means, for connecting said data signal line to said plurality of first storage means, and for connecting said control signal line to said plurality of third storage means; and means for disabling said second connecting means, thereby disconnecting said one basic circuit from said signal bus.

14. An integrated-circuit store according to claim 13 further comprising:

means for selectively transmitting said at least one status signal stored within one of said plurality of third means over said control signal line to the remainder of said basic circuits and to predetermined others of said third means within said one basic circuit; and means associated with said integrated circuit store for enabling one and only one of said third means of said basic circuits to be responsive to said transmitted status signal at any given time, whereby a unique address may be assigned to each of said plurality of second storage means.

15. An integrated-circuit store having applied thereto from a controller a plurality of address and control signals and connected to an external data line and adapted to transfer data signals to and from said external data line, said store comprising a body of semiconductor material, and a plurality of basic circuits formed on said body of semiconductor material as a common substrate, each one of said basic circuits comprising:

a bus portion including one or more address signal lines, one or more control signal lines, and a data signal line, said bus portion abutting a like adjacent bus portion to form therewith a signal bus interconnecting said plurality of basic circuits;

switching means;

a plurality of first means for storing data signals;

a plurality of second means each capable of storing a different address;

a plurality of third means each capable of storing a status signal, said plurality of first, second, and third storage means being so arranged that each of said first storage means has associated with it a unique one of said second and third storage means;

enabling means associated with each of said third means and responsive to said status signal for selectively enabling the associated second storage means to store a unique address transmitted over said one or more address signal lines;

fourth means associated with each of said third means for selectively inhibiting the operation of said enabling means, said fourth means being responsive to the contents of said third means, to the contents of predetermined others of said third means within said one basic circuit, and to an inhibit control signal transmitted over said one or more control signal lines;

fifth means, associated with said one or more control signal lines, for ordering said one basic circuit relative to the other basic circuits of said integrated-circuit store, said fifth means being responsive to the contents of all of said third means of the basic circuits of higher order than said one basic circuit to selectively generate said inhibit control signal over said one or more control signal lines to the basic circuits of lower order;

sixth means, also associated with said one or more control signal lines, for ordering said second storage means relative to one another, said sixth storage means being responsive to the contents of all of said third means within said one basic circuit to selectively transmit said inhibit control signal to predetermined ones of said fourth means within said one basic circuit;

means for comparing address signals transmitted over said one or more address signal lines with the contents of said second storage means, said comparing means being responsive to a concidence between said address signals and a stored address within a particular second storage means to generate a control enable signal;

seventh means connected to each of said plurality of first storage means and responsive to said control enable signal to control the transfer of said data signals between said data signal line and the first storage means associated with said particular second storage means;

second means for connecting via said switching means said address signals to said comparing means, said control signals to said fourth, fifth and sixth means, and said data signal line to said seventh means and said first storage means; and means for selectively disabling said switching means to disconnect alternatively said one basic circuit or one or more of said first storage means from said signal bus.

16. An integrated-circuit store according to claim 15, wherein said second connecting means comprises one or more fuses.

17. An integrated-circuit store having applied thereto from a controller a plurality of address and control signals and connected to an external data line and adapted to transfer data signals to and from said external data line, said store comprising a body of semiconductor material, and a plurality of basic circuits formed on said body of semiconductor material as a common substrate, each one of said basic circuits comprising:

a bus portion including a plurality of address, control, and data signal lines, said bus portion abutting a like adjacent bus portion to form therewith a signal bus interconnecting said plurality of basic circuits;

a first switching means;

a set of second switching means;

a plurality of first means for storing data signals;

a plurality of second means each capable of storing a different address;

a plurality of third means each capable of storing a status signal, said plurality of first, second, and third storage means being so arranged that each of said first storage means has associated with it a unique one of said second and third storage means;

enabling means associated with each of said third means and responsive to said status signal for selectively enabling the associated second storage means to store a unique address transmitted over said address signal lines;

fourth means associated with each of said third means for selectively inhibiting the operation of said enabling means, said fourth means being responsive to the contents of said third means, to the contents of predetermined others of said third means within said one basic circuit, and to an inhibit control signal transmitted over a predetermined one of said control signal lines;

fifth means, associated with said predetermined control signal line, for ordering said one basic circuit relative to the other basic circuits of said integrated-circuit store, said fifth means being responsive to the contents of all of said third means of the basic circuits of higher order than said one basic circuit to selectively generate said inhibit control signal over said predetermined control signal line to the basic circuits of lower order;

sixth means, associated with said predetermined control signal line, for ordering said second storage means within said one basic circuit relative to one another, said sixth storage means being responsive to the contents of all of said third means within said one basic circuit to selectively transmit said inhibit control signal to predetermined ones of said fourth means within said one basic circuit;

means for comparing address signals transmitted over said address signal lines with the contents of said second storage means, said comparing means being responsive to a coincidence between said address signals and a stored address within a particular second storage means to generate a control enable signal;

seventh means connected to each of said plurality of first storage means and responsive to said control enable signal to control the transfer of said data signals between one of said data signal lines and the first storage means associated with said particular second storage means;

second means for connecting via said first switching means said address signals to said comparing means, said control signals to said fourth, fifth and sixth means, and said one data signal line to said seventh means;

means for disabling said first switching means, thereby disconnecting said one basic circuit from said signal bus;

third means for connecting via said set of second switching means another of said data lines with said plurality of first storage means; and means for disabling any of said second switching means, thereby disconnecting one or more of said first storage means from said signal bus.

18. An integrated-circuit store according to claim 17 wherein said first and second switching means comprises one or more fuses.

19. An integrated-circuit store according to claim 17 wherein said first and second switching means comprises one or more semipermanent voltage-programmable transistors.

20. An integrated-circuit store according to claim 17 wherein said first and second switching means comprises one or more programmable connective devices.

* * * * *